(12) United States Patent
Shim et al.

(10) Patent No.: US 11,476,910 B2
(45) Date of Patent: Oct. 18, 2022

(54) METHOD AND DEVICE FOR PERFORMING BEAMFORMING IN WIRELESS COMMUNICATION SYSTEM

(71) Applicant: SAMSUNG ELECTRONICS CO., LTD., Gyeonggi-do (KR)

(72) Inventors: Seijoon Shim, Gyeonggi-do (KR);
Chongdon Kim, Gyeonggi-do (KR);
Hayoung Yang, Gyeonggi-do (KR);
Chanho Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 21 days.

(21) Appl. No.: 17/257,797

(22) PCT Filed: Jul. 2, 2019

(86) PCT No.: PCT/KR2019/008058
§ 371 (c)(1),
(2) Date: Jan. 4, 2021

(87) PCT Pub. No.: WO2020/009432
PCT Pub. Date: Jan. 9, 2020

(65) Prior Publication Data
US 2021/0288704 A1   Sep. 16, 2021

(30) Foreign Application Priority Data
Jul. 5, 2018 (KR) ........................ 10-2018-0078174

(51) Int. Cl.
*H04L 27/28* (2006.01)
*H04B 7/06* (2006.01)
(Continued)

(52) U.S. Cl.
CPC ......... *H04B 7/0617* (2013.01); *H04B 7/0456* (2013.01); *H04B 7/0626* (2013.01); *H04L 5/0048* (2013.01); *H04L 5/0057* (2013.01)

(58) Field of Classification Search
CPC .. H04B 7/0626; H04B 7/0617; H04B 7/0874; H04B 7/0456; H04B 7/0452;
(Continued)

(56) References Cited

U.S. PATENT DOCUMENTS 9,838,101 B2   12/2017   Kang et al.
2013/0039401 A1   2/2013   Han et al.
(Continued)

FOREIGN PATENT DOCUMENTS

KR   1020130017567   2/2013
KR   1020130084607   7/2013
(Continued)

OTHER PUBLICATIONS

Huawei, HiSilicon, "CSI-RS Design for Beam Management", R1-1709947, 3GPP TSG RAN WG1 NR Ad Hoc Meeting, Jun. 27-30, 2017, 13 pages.
(Continued)

*Primary Examiner* — Khai Tran
(74) *Attorney, Agent, or Firm* — The Farrell Law Firm, P.C.

(57) ABSTRACT

Disclosed is a 5G or pre-5G communication system for supporting a data transmission rate higher than that of a 4G system such as LTE. According to one embodiment, disclosed is a method by which a base station performs downlink beamforming in a wireless access system, comprising the steps of, receiving, from a terminal, information related to a channel state, checking, on the basis of the information related to a channel state, channel state information estimated by subcarrier group unit, acquiring analog beamforming information and digital beamforming information on the basis of the channel state information, performing, by subcarrier group unit, hybrid beamforming in which the analog beamforming and the digital beamforming are combined, on
(Continued)

the basis of the analog beamforming information and the digital beamforming information, and transmitting subcarrier group information corresponding to the subcarrier group, wherein the number of subcarriers in the subcarrier group is no more than the number of subcarriers included in one resource block.

15 Claims, 9 Drawing Sheets

(51) Int. Cl.
*H04B 7/0456* (2017.01)
*H04L 5/00* (2006.01)

(58) Field of Classification Search
CPC ...... H04L 5/005; H04L 5/0057; H04W 24/10; H04W 72/085; H04W 72/042
USPC .......................... 375/260, 262, 267; 370/329
See application file for complete search history.

(56) References Cited

U.S. PATENT DOCUMENTS

| | | | |
|---|---|---|---|
| 2013/0100922 A1 | 4/2013 | Ahn et al. | |
| 2013/0258972 A1 | 10/2013 | Kim et al. | |
| 2013/0301454 A1 | 11/2013 | Seol et al. | |
| 2014/0362944 A1 | 12/2014 | Zhang et al. | |
| 2016/0241323 A1 | 8/2016 | Ko et al. | |
| 2018/0205443 A1* | 7/2018 | Kumagai | H04B 7/0456 |
| 2018/0287682 A1* | 10/2018 | Kwak | H04W 24/10 |
| 2019/0123864 A1* | 4/2019 | Zhang | H04B 7/088 |
| 2019/0393944 A1* | 12/2019 | Huang | H04B 7/0608 |
| 2021/0266128 A1* | 8/2021 | Zhang | H04L 5/0048 |

FOREIGN PATENT DOCUMENTS

| | | |
|---|---|---|
| KR | 1020130127376 | 11/2013 |
| KR | 1020160082235 | 7/2016 |
| KR | 1020170093675 | 8/2017 |
| WO | WO 2018/031807 | 2/2018 |

OTHER PUBLICATIONS

Guangxu Zhu et al., "Hybrid Beamforming via the Kronecker Decomposition for the Millimeter-Wave Massive MIMO Systems", XP080762471, Apr. 12, 2017, 32 pages.
European Search Report dated Jul. 7, 2021 issued in counterpart application No. 19830342.2-1216, 11 pages.
PCT/ISA/210 Search Report issued on PCT/KR2019/008058, dated Oct. 4, 2019, pp. 7.
PCT/ISA/237 Written Opinion issued on PCT/KR2019/008058, dated Oct. 4, 2019, pp. 4.
Yu, Xianghao et al., "Alternating Minimization Algorithms for Hybrid Precoding in Millimeter Wave MIMO Systems", arXiv:1601.07340v1 [cs.IT] Jan. 2016, pp. 16.
Ardah, Khaled et al., "Block Diagonalization For Multicell Multiuser MIMO Systems with Other-Cell Interference", XXXIV Simpósio Brasileiro De Telecomunicações—SBrT2016 . . . Aug. 20, 2016 to Sep. 2, 2016, pp. 115-119.
Pi, Zhouyue et al., "An Introduction to Millimeter-Wave Mobile Broadband Systems", IEEE Communications Magazine, Jun. 2011, pp. 101-107.
Ghauch, Hadi et al., "Subspace Estimation and Decomposition for Large Millimeter-Wave MIMO Systems", . . . . IEEE Journal of Selected Topics in Signal Processing, vol. 10, No. 3, Apr. 2016, pp. 528-542.
Sohrabi, Foad et al., "Hybrid Digital and Analog Beamforming Design for Large-Scale Antenna Arrays", arXiv:1601.06814v1 [cs.IT] Jan. 2016, pp. 13.

* cited by examiner

METHOD AND DEVICE FOR PERFORMING BEAMFORMING IN WIRELESS COMMUNICATION SYSTEM

PRIORITY

This application is a National Phase Entry of PCT International Application No. PCT/KR2019/008058, which was filed on Jul. 2, 2019, and claims priority to Korean Patent Application No. 10-2018-0078174, which was filed on Jul. 5, 2018, the contents of each of which are incorporated herein by reference.

TECHNICAL FIELD

The present invention relates to a wireless access system, and more specifically, to a method for performing downlink hybrid beamforming using an analog precoder and a digital precoder including a null precoder in a wireless access system supporting massive antenna technology and a device supporting the same.

The present invention relates to a wireless access system, and more specifically, a method for performing downlink hybrid beamforming, with a minimum scheduling unit related to beamforming in a broadband wireless access system set as a subcarrier group unit, and a device supporting the same.

BACKGROUND ART

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Beamforming may be used in different communication systems to improve signal to noise ratio (SNR) and/or signal to interference noise ratio (SINR) or to improve a given communication link.

There may be a number of different ways to implement beamforming, but may be largely characterized by three different types. For example, there is analog (or radio frequency (RF)) beamforming, digital (or baseband) beamforming, and hybrid beamforming that uses both analog beamforming and digital beamforming to form a beam.

In the general MIMO environment, there are assumed to be up to eight transmit/receive antennas. However, as evolving to massive MIMO, the number of antennas may increase to a few tens or hundreds or more. Massive antenna technology is a major core technology for 4G systems and 5G systems, which are currently under discussion for standardization, and is a technology that increases spectral efficiency through spatial separation through multiple antennas. In LTE, the standard for supporting 12 and 16 antennas in the standard for full dimension multiple input multiple out (FD-MIMO) has been completed in Rel-13, and furthermore, the standard for supporting, e.g., 24 and 32 antennas is in progress in Rel-14 LTE.

In the 5G standard, digital (or baseband) beamforming and analog beamforming are core technologies of the standard, and increasing the number of antennas is an essential consideration to overcome pathloss, such as free space loss in mm-Wave. Thus, it is a critical issue to efficiently calculate and implement a beamforming precoder according to an increase in the number of antennas supported in the modern communication system.

Since the millimeter-band channel may suffer from significant path attenuation, cell coverage may be reduced and the link quality may be deteriorated, whereas the millimeter-band signal wavelength is as short as several millimeters, so many antennas may be placed in a small space. Therefore, it is possible to compensate for the problems of coverage reduction and link quality degradation by creating an antenna array of multiple antennas and using directional beams at the transmit/receive ends via the antenna array. Therefore, beamforming technology is of significance in mm-Wave mobile communication systems.

The core issue with beamforming implementation is how to identify an appropriate beamforming matrix for each station, and there are open loop methods and closed loop methods. In the closed loop methods, the network generates an adequate beamforming matrix based on a specific report from the terminal. To that end, the network transmits a specific pilot signal, called CSI-RS, and the terminal evaluates the quality of the received signal based on the received CSI-RS and reports the result to the network.

DETAILED DESCRIPTION OF THE INVENTION

Technical Problem

According to various embodiments, there are proposed an efficient precoder structure appropriate for a scheduler using the identified characteristics of the broadband massive antennas and a precoding scheme necessary therefor.

According to various embodiments, the base station and the terminal may configure the minimum scheduling unit as the subcarrier group, and the base station may apply beamforming per subcarrier group, and the terminal may perform channel estimation and data decoding per subcarrier group.

According to various embodiments, when the base station and the terminal configure the minimum scheduling unit as the subcarrier group, the maximum transmission bandwidth of the subcarrier is reduced as compared with the maximum transmission bandwidth of the resource block so that influence by frequency selectivity fading is reduced, and thus, the performance of the base station and terminal may be improved.

According to various embodiments, the base station may apply a hybrid beamforming structure including a digital precoder (baseband precoder) configured to have a serial structure of a null precoder and a stream parallelizing precoder, thereby minimizing multi-user interference and maximizing the transmission rate per user and hence maximizing the total data transmission rate.

Technical Solution

According to various embodiments, a method for performing downlink beamforming by a base station in a wireless access system comprises receiving information related to a channel state from a terminal, identifying channel state information estimated on a per-subcarrier group basis, based on the channel state-related information, obtaining analog beamforming information and digital beamforming information based on the channel state information, performing hybrid beamforming, which is a combination of analog beamforming and digital beamforming, on a per-subcarrier group basis, based on the analog beamforming information and the digital beamforming information, and transmitting subcarrier group information corresponding to the subcarrier group, wherein the subcarrier group includes a number of subcarriers less than or equal to a number of a plurality of subcarriers included in one resource block.

According to various embodiments, a method performed by a terminal in a wireless access system comprises receiving subcarrier group information corresponding to a subcarrier group unit to which beamforming is applied by a base station, from the base station, identifying the subcarrier group information, and performing channel estimation and decoding based on the identified subcarrier group information, wherein the subcarrier group includes a number of subcarriers less than or equal to a number of a plurality of subcarriers included in one resource block.

According to various embodiments, a base station configured to perform downlink beamforming in a wireless access system comprises a transceiver configured to transmit/receive a wireless signal, and a processor, wherein the processor is configured to control the transceiver to receive information related to a channel state from a terminal, identify channel state information estimated on a per-sub carrier group basis, based on the channel state-related information, obtain analog beamforming information and digital beamforming information based on the channel state information, perform hybrid beamforming, which is a combination of analog beamforming and digital beamforming, on a per-sub carrier group basis, based on the analog beamforming information and the digital beamforming information, and control the transceiver to transmit sub carrier group information corresponding to the sub carrier group, wherein the subcarrier group includes a number of subcarriers less than or equal to a number of a plurality of subcarriers included in one resource block.

According to various embodiments, a terminal in a wireless access system comprises a transceiver configured to transmit/receive a wireless signal and a processor, wherein the processor is configured to control the transceiver to receive subcarrier group information corresponding to a subcarrier group unit to which beamforming has is by a base station, from the base station, identify the subcarrier group information, and perform channel estimation and decoding based on the identified subcarrier group information, wherein the subcarrier group includes a number of subcarriers less than or equal to a number of a plurality of subcarriers included in one resource block.

Advantageous Effects

According to various embodiments, the base station and the terminal may configure the minimum scheduling unit as the subcarrier group, and the base station may apply beamforming per subcarrier group, and the terminal may perform channel estimation and data decoding per subcarrier group.

According to various embodiments, when the base station and the terminal configure the minimum scheduling unit as the subcarrier group, the maximum transmission bandwidth of the subcarrier is reduced as compared with the maximum transmission bandwidth of the resource block so that influence by frequency selectivity fading is reduced, and thus, the performance of the base station and terminal may be improved.

According to various embodiments, the base station may apply a hybrid beamforming structure including a digital precoder (baseband precoder) configured to have a serial structure of a null precoder and a stream parallelizing precoder, thereby minimizing multi-user interference and maximizing the transmission rate per user and hence maximizing the total data transmission rate.

MODE FOR CARRYING OUT THE INVENTION

Figure 1:
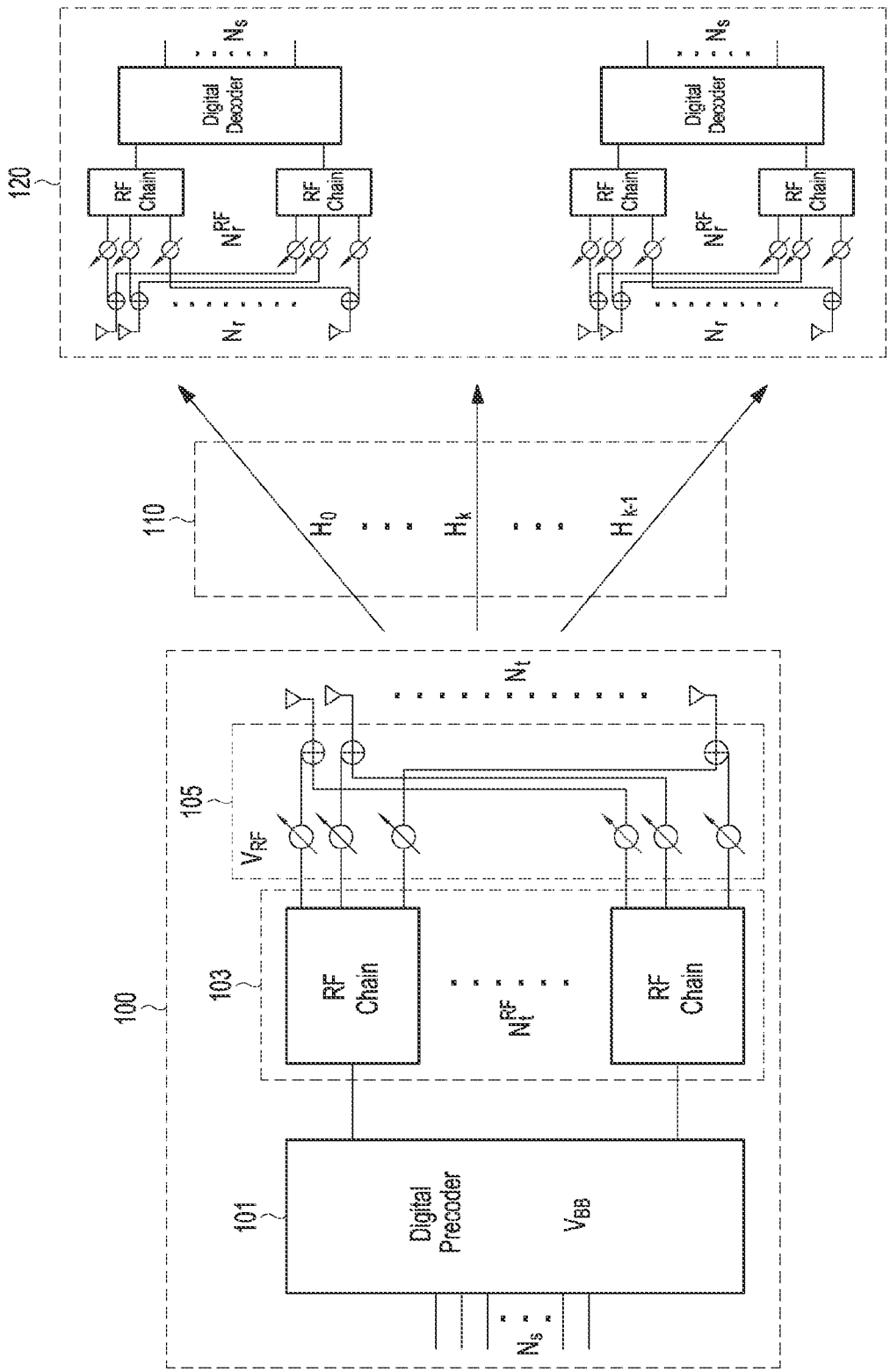
FIG. 1 is a view illustrating a base station and a terminal for performing downlink hybrid beamforming in a wireless access system supporting a massive multi-input-multi-output (MIMO) system according to various embodiments.

Various changes may be made to the present invention, and the present invention may come with a diversity of embodiments. Some embodiments of the present invention are shown and described in connection with the drawings. However, it should be appreciated that the present disclosure is not limited to the embodiments, and all changes and/or equivalents or replacements thereto also belong to the scope of the present disclosure.

The terms "first" and "second" may be used to describe various components, but the components should not be limited by the terms. The terms are used only to distinguish one component from another.

The terms as used herein are provided merely to describe some embodiments thereof, but not to limit the present disclosure. As used herein, the singular forms "a," "an," and "the" are intended to include the plural forms as well, unless the context clearly indicates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, various embodiments are described below with reference to the accompanying drawings and, in describing embodiments in connection with the drawings, the same reference denotations are used to refer to the same or similar components, and no duplicate description is presented.

Hereinafter, preferred embodiments of the present invention are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Embodiments of the disclosure are described focusing primarily on the relationship in data transmission and reception between the terminal and the base station. In the disclosure, "base station" means a network terminal node to directly communicate with a terminal.

In the disclosure, a particular operation described to be performed by a base station may be performed by an upper node of the base station in some cases. In other words, in a network constituted of multiple network nodes including the base station, various operations performed to communicate with a terminal may be performed by the base station or other network nodes than the base station. "Base station (BS)" may be interchangeably used with the term "fixed station," "Node B," "eNode B (eNB)," or "access point (AP)." "Relay" may be interchangeably used with "relay node (RN)" or "relay station (RS)."

"Terminal" may be interchangeably used with the term "UE (User Equipment)," "MS (Mobile Station)," "MSS (Mobile Subscriber Station)," "SS (Subscriber Station)," "AMS (Advanced Mobile Station)," "WT (Wireless terminal)," "MTC (Machine-Type Communication) device," "M2M (Machine-to-Machine) device," or "D2D (Device-to-Device) device."

In the disclosure, each different piece of information sent using multi-antenna technology is defined as a 'transmit stream' or simply as a 'stream.' Such 'stream' may be denoted a 'layer.'

The terminology used herein is provided for a better understanding of the disclosure, and changes may be made thereto without departing from the technical spirit of the disclosure.

The bold upper and lower casing letters, respectively, denote a matrix and a vector. $(\ )^T$ and $(\ )^H$ denotes transposing and conjugate-transposing a matrix.

Spatial multiplexing means multi-layer transmission. If the transmitter and receiver each has a plurality of antennas, it is possible to avoid interference between different layers depending on proper signal processing in the transmitter and receiver. Thus, in the case of spatial multiplexing, the channel may be seen as a channel that has a plurality of inputs by the plurality of antennas of the transmitter, and has a plurality of outputs by the plurality of antennas of the receiver.

FIG. 1 is a view illustrating a base station and a terminal for performing downlink hybrid beamforming in a wireless access system supporting a massive multi-input-multi-output (MIMO) system according to various embodiments.

The massive multi-input-multi-output (MIMO) system regards the case where the base station 100 and the terminal 120 each use a plurality of antennas and theoretically has increased channel transmission capacity as compared with when only either the base station or terminal uses a plurality of antennas.

That is, since the increase in channel transmission capacity is proportional to the number of antennas, the transmission rate and the frequency efficiency may be improved.

For example, in the case where the base station 100 has $N_T$ transmission antennas and the terminal 120 has $N_r$ reception antennas as shown in FIG. 1, if the maximum transmission rate when one antenna is used is $R_o$, the transmission rate when multiple antennas are used may be theoretically increased up to the product of the maximum transmission rate $R_o$ and a rate increase rate $R_i$ as shown in Equation 1 below. Here, $R_i$ is the smaller of $N_T$ and $N_R$.

$$R_i = \min(N_T, N_R) \quad \text{[Equation 1]}$$

According to various embodiments, in the massive MIMO environment, instead of selectively applying only one of analog beamforming and digital beamforming, a base station structure in which hybrid beamforming, which is a fusion of analog beamforming and digital beamforming, is applied, may be provided, thereby reducing the implementational complexity of the base station and obtaining the maximum beamforming gain using massive MIMO.

Referring to FIG. 1, according to various embodiments, a radio frequency (RF) chain 103 is a processing block in which a single digital signal is converted into an analog signal and is a structure inevitably generated as the hybrid beamforming structure adopts the scheme of connecting RF chains by bundling several antennas since the cost is increased when each antenna has an RF chain when the base station uses massive antennas.

Referring to FIG. 1, $N_t$ means the number of the antennas of the transmission base station, $N_r$ means the reception antenna of each terminal, $N_{RF}$ means the total number of the RF chains, $N_t^{RF}$ means the number of the independent antennas provided in each RF chain and has the relationship of $N_t = N_t^{RF} \times N_{RF}$.

According to various embodiments, $N_s$ indicates the number of transmission data streams, and $N_s$ is equal to or smaller than $N_t$, and $N_s$ signals may be spatially multiplexed and transmitted via $N_t$ transmission antennas.

According to various embodiments, k is the number of the terminals spatially multiple-accessed, and $N_{s,k}$ is the number of transmit streams in the kth terminal.

According to various embodiments, k is the subcarrier index according to various embodiments, and $N_{s,k}$ is the number of transmit streams at subcarrier index k.

For example, subcarrier index k has a value from 0 to $N_{FFT}-1$. In this case, $N_{FFT}$ is the maximum fast Fourier transform (FFT) supported by the system, and the total number of subcarriers may be limited to be within the FFT size.

In the disclosure, kth terminal, subcarrier index k, or $k^{th}$ user all may be used to have the same meaning.

According to various embodiments, since the maximum information transmittable is $N_T$, the transmission information may be represented as a vector as shown in Equation 2.

$$s = [s_1, s_2, \ldots, s_{N_T}]^T \quad [\text{Equation 2}]$$

In the beamforming structure shown in FIG. 1, for the input signal $s_k$, the reception signal model $y_k$ in the kth terminal or subcarrier index k may be expressed as shown in Equation 3.

$$y_k = H_k V_{RF} V_{BB,k} s_k + H_k \Sigma_{l \neq k}^K V_{RF} V_{BB,l} s_l + n_k \quad [\text{Equation 3}]$$

For example, $H_k$ means a channel information matrix 110 in the kth terminal or subcarrier index k having a size of $N_r \times N_t$.

For example, $y_k$ means the reception signal vector of the kth terminal having a size of $N_r \times 1$ or the reception signal vector at subcarrier index k, and $s_k$ means the transmission signal vector of the kth terminal having a size of $N_s \times 1$ or the transmission signal vector at subcarrier index k. $s_l$ is the transmission signal vector having a size of $N_t^{RF} \times 1$, and $n_k$ is the noise vector of the kth terminal having a size of $N_r \times 1$.

According to the hybrid beamforming structure of the base station 100 shown in FIG. 1, a baseband digital signal to which a digital beamforming scheme first using a digital (or baseband) precoder $V_{BB}$ 101 has been applied is converted into an RF band analog signal via the RF chain 103, and an analog beamforming scheme secondly using an analog precoder $V_{RF}$ 105 is applied to the analog signal.

The digital beamforming shown in FIG. 1 may apply an independent beamforming scheme per user, with the same time-frequency resources. Analog beamforming is limited by the need for a common beamforming scheme being applied to users with the same time-frequency resources.

According to the hybrid beamforming structure shown in FIG. 1, the digital beamforming scheme is free in beamforming for multiple users/streams whereas the analog beamforming scheme performs beamforming by the same weight vector/matrix for the whole transmission band and thus has difficulty in independent beamforming per user or per stream.

For example, the digital (or baseband) precoder $V_{BB,k}$ means the precoding matrix (weight matrix) for digital beamforming in the kth terminal or subcarrier index k having a size of $N_t^{RF} \times N_{s,k}$, and the analog precoder $V_{RF}$ means the precoding matrix (weight matrix) for analog beamforming in all the subcarriers having a size of $N_t \times N_t^{RF}$.

For example, in Equation 3, $V_{RF}V_{BB,k}$ means the precoding matrix for hybrid beamforming in the kth terminal having a size of $N_t \times N_{s,k}$ and subcarrier index k, and $V_{RF}V_{BB,l}$ means the precoding matrix of the interfering terminal at subcarrier index k or the kth terminal having a size of $N_t \times N_{s,l}$.

In the hybrid beamforming structure shown in FIG. 1, to restore, in the reception data $y_k$, the transmission data $s_k$ in the model as shown in Equation 3, the inverse matrix of the channel information matrix $H_k$ is needed. However, there may be some matrix whose inverse matrix does not exist, and calculation of an inverse matrix may be not simple. Thus, the channel information matrix H may be represented as $H = U \Lambda V^H$ using singular value decomposition (SVD).

For example, as the precoding matrix for hybrid beamforming of the base station 100, the matrix V is used and, if the matrix $U^H$ is applied in the terminal, the overall channel becomes such a matrix as $H' = \Lambda$. Since H' is the diagonal matrix having a size of $N_s \times N_s$ having the largest $N_s$ eigen value diagonal elements of H, no interference exists between the spatially multiplexed in the terminal 120.

Further, since U and V both have orthogonal columns, the transmit power, as well as the noise level of the decoder, does not vary spatially under the assumption of white noise.

In the hybrid beamforming structure shown in FIG. 1, a scheme for optimization to increase the channel capacity in a single user may be found using Equation 4 below in such a model as Equation 3.

$$V_{opt} V_{RF} V_{BB} \quad [\text{Equation 4}]$$

For example, $V_{opt}$ is the precoding matrix for hybrid beamforming when the maximum channel capacity is provided and may be the right singular matrix of the singular value decomposition (SVD) of the channel matrix H. That is, in $H = U \Lambda V^H$, $V_{opt} = V$.

Accordingly, from Equation 4, $V_{BB}$ may become Equation 5.

$$V_{BB} = \text{pinv}(V_{RF}) V_{opt} \quad [\text{Equation 5}]$$

pinv( ) is the pseudo inverse function.

According to various embodiments, the analog beamforming precoder $V_{RF}$ needs to be implemented in hardware and may thus be implemented as a low-freedom, simple phase shift.

For example, the analog beamforming precoder $V_{RF}$ may be obtained as one precoder among limited analog beamforming precoders that may be represented as phase shift, and the digital precoder $V_{BB}$ may be obtained based on Equation 5 and, from this, an algorithm to find an appropriate analog beamforming precoder $V_{RF}$ may be applied so that the precoding matrix $V_{RF}, V_{BB}$ for hybrid beamforming when it has the maximum channel capacity according to Equation 5 may be obtained.

As described above, in the method for obtaining the precoding matrixes $V_{RF}$ and $V_{BB}$ for hybrid beamforming when the base station has the maximum channel capacity, the base station needs to first derive the optimized $V_{opt}$ from $H_k$ and own it and, as shown in Equation 3, is limited in that it is not a solution for maximally addressing the sum transmission rate in the channel model considering multiple users.

Figure 2:
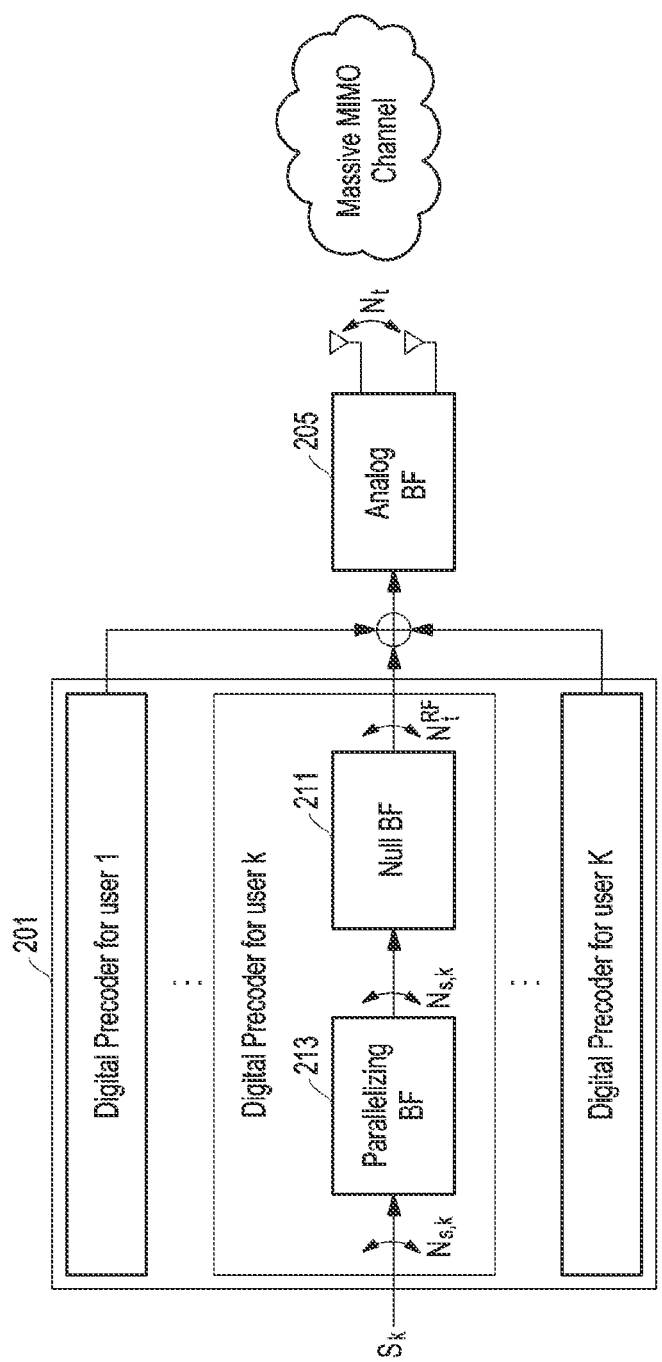
FIG. 2 is a view illustrating a base station for performing hybrid beamforming using a digital precoder including a null precoder in a wireless access system supporting a massive MIMO system according to various embodiments.

FIG. 2 is a view illustrating a base station for performing hybrid beamforming using a digital precoder including a null precoder in a wireless access system supporting a massive MIMO system according to various embodiments.

In a wireless access system supporting massive MIMO system, the maximum total data transmission rate that may be obtained when the source coding and channel coding schemes are used may be defined as sum channel capacity.

According to various embodiments, the precoding matrix for hybrid beamforming may be obtained based on the approach of the maximum channel capacity. For example, as an approach of the maximum channel capacity, the Shannon-Hartley theorem may be used.

As shown in FIG. 2, according to various embodiments, in the hybrid beamforming structure, independent digital beamforming may apply per user or per stream, and the $k^{th}$ user's digital precoder (baseband precoder) $V_{BB,k}$ may include the cascade of $V_k^{null}$ and transmit layer parallelizing precoder $V_k^P$.

In the disclosure, the cascade structure of $V_k^{null}$ and stream parallelizing precoder $V_k^P$ is defined as a cascade precoder.

As shown in FIG. 2, according to various embodiments, if the structure of the $k^{th}$ user's digital precoder (baseband precoder) $V_{BB,k}$ is reconfigured as the structure of the cascade precoder of $V_k^{null}$ and transmit layer parallelizing precoder $V_k^P$, that is, $V_{BB,k}=V_k^{null}V_k^P$, Equation 3 may be expanded to Equation 6.

$$y_k = H_k V_{RF} V_k^{null} V_k^P s_k + H_k \sum_{l \neq k}^{K} V_{RF} V_l^{null} V_l^P s_l + n_k \quad \text{[Equation 6]}$$

For example, $s_k$ is the transmission signal vector at subcarrier index k or the transmission signal vector of the kth terminal having a size of $N_s$ X1, $N_{s,k}$ is the number of transmit streams at subcarrier index k or the kth terminal, $N_t^{RF}$ is the number of independent antennas provided per RF chain, and $N_t$ is the number of transmission base station antennas.

Meanwhile, according to various embodiments, the total data transmission rate $R_k$ of each user is as shown in Equation 7.

$$R_k = \log 2(\det(I + \widetilde{H}_k V_k^{null} V_k^P R_{s,k}(V_k^P)^H (V_k^{null})^H \widetilde{H}_k^H$$
$$(K_{n,k} + \widetilde{H}_k K_{u,k} \widetilde{H}_k^H)^{-1})) \quad \text{[Equation 7]}$$

In Equation 7, the channel information matrix $\widetilde{H}_k$ for the $k^{th}$ user considering the influence of the analog precoder $V_{RF}$ may be obtained based on information regarding the channel information matrix $H_k$ for the $k^{th}$ user and information regarding the analog precoder $V_{RF}$ for all the users and may be represented as $\widetilde{H}_k = H_k V_{RF}$, $R_{s,k} = E\{s_k s_k^H\}$, $K_{n,k} = E\{n_k n_k^H\}$, $K_{u,k} = E\{(\Sigma_{l \neq k}^K V_l^{null} V_l^P s_l)(\Sigma_{l \neq k}^K V_l^{null} V_l^P s_l)_k^H\}$ means, and $E\{\cdot\}$ means the averaging operator.

Under the assumption that the reception noise is the white Gaussian noise (WGN), Equation 7 is expanded to Equation 8 at the high signal-to-noise ratio (SNR).

$$R_k = \log 2(\det(I + \widetilde{H}_k V_k^{null} V_k^P R_{s,k}(V_k^P)^H (V_k^{null})^H \widetilde{H}_k^H)) -$$
$$\log 2(\det(\sigma_n^2 I + \widetilde{H}_k K_{u,k} \widetilde{H}_k^H)) \quad \text{[Equation 8]}$$

According to various embodiments, the $k^{th}$ user's digital precoder $V_{BB,k}(V_{BB,k} = V_k^{null}V_k^P)$ may be configured so that log 2 $(\det(\sigma_n^2 I + \widetilde{H}_k K_{u,k} \widetilde{H}_k^H))$ is minimized, and log 2$(\det(I + \widetilde{H}_k V_k^{null} V_k^P R_{s,k}(V_k^P)^H (V_k^{null})^H \widetilde{H}_k^H))$ is maximized, and $R_k$ in Equation 8 may be maximized.

For example, the 1st user's null precoder $V_l^{null}$ directly affecting $\widetilde{H}_k$ may be configured to, along with $\widetilde{H}_k$, form the null space, minimizing the influence from multi-user interference.

According to various embodiments, the $k^{th}$ user's null precoder $V_k^{null}$ may be used to minimize the influence form multi-user interference, and the $k^{th}$ user's null precoder $V_k^{null}$ may be obtained based on the channel information matrix $\widetilde{H}_k$ considering the influence of the analog precoder $V_{RF}$.

According to various embodiments, the $k^{th}$ user's transmit layer parallelizing precoder $V_k^P$ may be obtained based on the effective channel information matrix $$H_{eff,k}(H_{eff,k} \doteq \widetilde{H}_k V_k^{null} = H_k V_{RF} V_k^{null})$$

considering influence from the $k^{th}$ user's null precoder $V_k^{null}$.

For example, the $k^{th}$ user's transmit layer parallelizing precoder $V_k^P$ may be configured to allocate power per stream while meeting the power constraints by parallelizing the effective channel information matrix $H_{eff,k}$.

An embodiment for obtaining the digital precoder $V_{BB,k}$ by obtaining the null precoder $V_k^{null}$ based on the channel information matrix $\widetilde{H}_k$ considering the influence form the analog precoder $V_{RF}$ and obtaining the transmit layer parallelizing precoder $V_k^P$ based on the effective channel information matrix $H_{eff,k}$ considering the influence from the $k^{th}$ user's null precoder $V_k^{null}$ is described below with reference to FIG. 7.

According to various embodiments, the hybrid beamforming structure includes the digital precoder (baseband precoder) $V_{BB,k}$ configured as a cascade structure which is a serial structure of the null precoder $V_k^{null}$ and the stream parallelizing precoder $V_k^P$, thereby minimizing multi-user interference and maximizing the transmission rate for each user. Thus, the total data transmission rate may be maximized.

Figure 3:
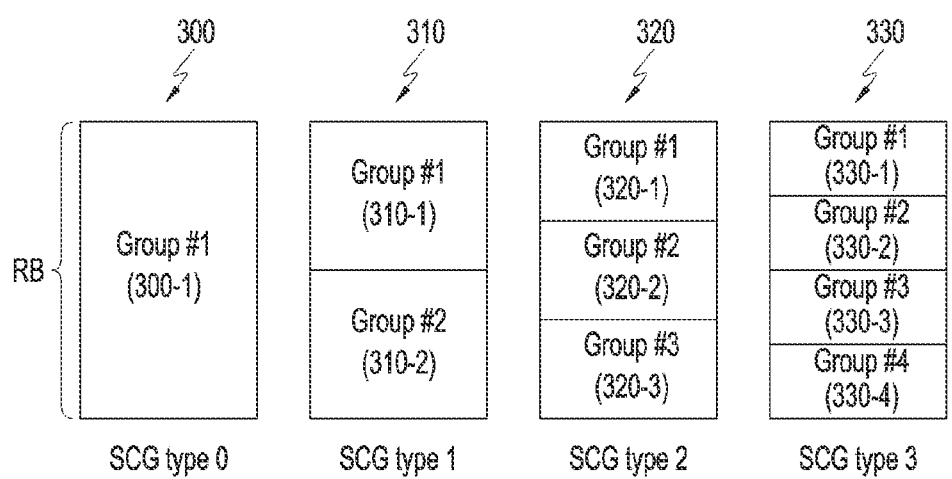
FIGS. 3 and 4 are concept views illustrating various examples of a subcarrier group corresponding to a minimum scheduling unit to which beamforming is applied in a wireless access system supporting broadband according to various embodiments.
Figure 4:
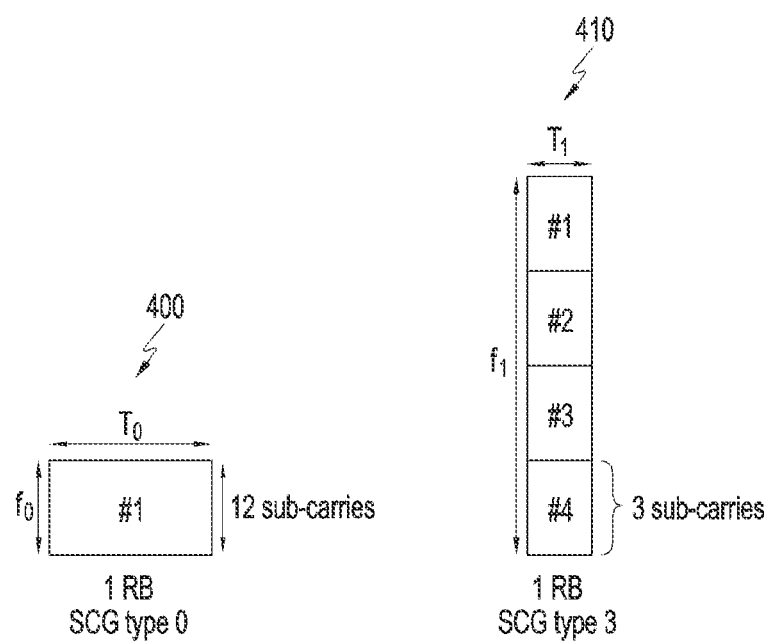

FIGS. 3 and 4 are concept views illustrating various examples of a subcarrier group corresponding to a minimum scheduling unit to which beamforming is applied in a wireless access system supporting broadband according to various embodiments.

In 4G/LTE systems, the minimum frequency resource unit that may be allocated to each terminal is the resource block (RB) corresponding to 180 kHz, and the minimum time resource unit is a transmission time interval (TTI) of 1 ms.

One downlink slot may include seven OFDM symbols in the frequency domain, and one resource block may include 12 subcarriers, but they are not limited thereto.

In 4G/LTE systems, each element on the resource grid is denoted as a resource element (RE), and one resource block includes 12×7 resource elements.

The number of resource blocks in the downlink slot depends upon the downlink transmission bandwidth. The structure of uplink slot may be identical to the structure of downlink slot.

According to various embodiments, the base station may apply beamforming based on the minimum scheduling unit, and the terminal may feed-back feedback information based on the minimum scheduling unit and perform channel estimation and decoding.

For example, channel estimation may be performed in the units of resource block which is the minimum scheduling unit allowed in the 4G/LTE standard and be performed in the units of bundling allowed in the standard.

For example, since the channel estimation unit in beamforming (BF) is the unit in which the same precoding is used upon channel estimation, it may become the minimum filtering unit in which noise reduction may be performed upon channel estimation.

For example, the larger filtering size is, the larger noise reduction effect may be obtained. Thus, the minimum scheduling unit for beamforming may be a critical unit for determining filtering.

Meanwhile, the larger filtering size may has a trade-off relationship in that it is effective in noise reduction but the beamforming gain is reduced in frequency selective fading.

According to various embodiments, the minimum scheduling unit may have a size of a bundle of resource blocks RB in the 4G/LTE system and, in the 5G/new radio (NR), it may be the unit of beamforming (BF) granularity.

As described above, in the 4G/LTE system, the minimum scheduling unit is one resource block unit.

For example, since in the 4G/LTE system, one resource block includes 12 subcarriers in the frequency domain and the subcarrier spacing (Δf) supports 15 kHz, the maximum transmission bandwidth of one resource block, which is the minimum scheduling unit in the 4G/LTE system, is 180 kHz.

Meanwhile, in the 5G/NR system, the subcarrier spacing supports at least one or more of 15 KHz, 30 KHz, 60 kHz, 120 kHz, 160 KHz, 240 kHz and 480 kHz, and thus, as the maximum transmission bandwidth of one resource block, 180 kHz, 360 kHz, 720 kHz, 1.44 MHz, 1.92 MHz, 2.88 MHz, and 5.76 MHz may be supported.

Thus, when the minimum scheduling unit is one resource block in the 5G/NR system, the maximum transmission bandwidth of one resource block is equal to or larger than the maximum transmission bandwidth, 180 kHz, of one resource block which is the minimum scheduling unit of the 4G/LTE system.

For example, if the maximum subcarrier spacing, 480 kHz, when applying the broadband beamforming, such as mmWave, is applied, the size of one resource block which is the minimum scheduling unit may correspond to a 5.76 MHz band.

In this case, if broadband beamforming is applied, with one resource block unit whose maximum transmission bandwidth is 5.76 MHz set as the beamforming granularity unit, the beamforming gain may be reduced by the influence of frequency selectivity fading since mmWave has very sensitive scattering characteristics due to ultra-high frequency properties.

According to various embodiments, the minimum scheduling unit in the base station and terminal performing beamforming may be set as a subcarrier group having a frequency bandwidth identical to or smaller than the frequency bandwidth of one resource block.

For example, the subcarrier group which is the minimum scheduling unit may include the same or smaller number of subcarriers as/than 12 subcarriers included in one resource block.

According to various embodiments, the type of the subcarrier group may be varied depending on the number of subcarriers included in the subcarrier group.

For example, as shown in FIG. 3, the types of the subcarrier group may include a first subcarrier group (SCG type 0) 300 including 12 subcarriers included in one resource block, a second subcarrier group (SCG type 1) 310 including six subcarriers, a third subcarrier group (SCG type 2) 320 including four subcarriers, and a fourth subcarrier group (SCG type 3) 330 including three subcarriers.

For example, as shown in FIG. 3, one resource block may include one first subcarrier group 300-1, two second subcarrier groups 310-1 and 310-2, three third subcarrier groups 320-1, 320-2, and 320-3, or four fourth subcarrier groups 330-1, 330-2, 330-3, and 330-4.

For example, as shown in FIG. 4, when the first subcarrier group (SCG type 0) 400 includes 12 subcarriers having a subcarrier spacing of 60 kHz, the maximum transmission bandwidth of the subcarrier group may be $f_0$=720 KHz.

Further, as shown in FIG. 4, when the fourth subcarrier group (SCG type 3) 410 includes three subcarriers having a subcarrier spacing of 240 KHz, the maximum transmission bandwidth of the subcarrier group is identical to the maximum transmission bandwidth, 720 kHz, of the first subcarrier group.

Meanwhile, since the subcarrier spacing and the symbol duration have an inverse relation, the subcarrier spacing, 240 KHz, of the fourth subcarrier group is four times the subcarrier spacing, 60 KHz, of the first subcarrier group as shown in FIG. 4, the symbol duration of the first subcarrier group becomes four times the symbol duration of the fourth subcarrier group.

According to various embodiments, since the base station may apply beamforming on a per-subcarrier group basis, beamforming may be applied, with a different beamforming weight vector applied per subcarrier group.

Further, according to various embodiments, the terminal may obtain feedback information based on the reference signal received on downlink from the base station and feed back the feedback information on a per-subcarrier group basis.

For example, the feedback information may include channel state information about the downlink.

In other words, according to various embodiments, when the base station and the terminal configure the minimum scheduling unit as the subcarrier group, the maximum transmission bandwidth of the subcarrier is reduced as compared with the maximum transmission bandwidth of the resource block so that influence by frequency selectivity fading is reduced, and thus, the performance of the base station and terminal may be improved.

Figure 5:
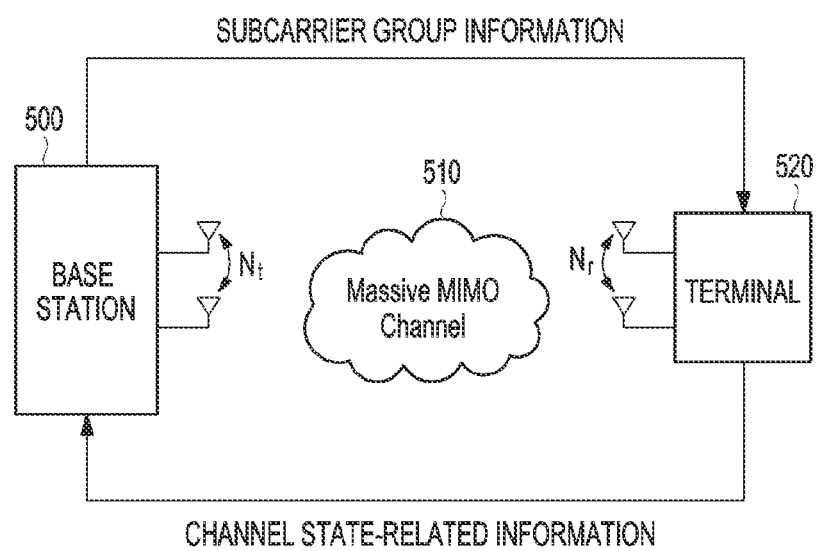
FIG. 5 is a view illustrating information transmitted/received between a base station and a terminal in a wireless access system supporting a massive MIMO system according to various embodiments.

FIG. 5 is a view illustrating information transmitted/received between a base station and a terminal in a wireless access system supporting a massive MIMO system according to various embodiments.

As shown in FIG. 5, the base station may transmit subcarrier group information to the terminal via downlink, and the terminal may transmit channel state-related information to the base station via uplink.

According to various embodiments, the channel state-related information may include feedback information (e.g., channel state information (CSI)) transmitted from the terminal in response to the reference signal (e.g., the channel state information reference signal (CSI-RS)) transmitted to the terminal or the reference signal (e.g., the sounding reference signal (SRS)) transmitted from the terminal via downlink.

For example, the feedback information may include channel state information about the downlink.

For example, the channel state information may include at least one or more of the precoding matrix index (PMI), rank indicator (RI), and channel quality indicator (CQI).

For example, the RI denotes the rank information about the channel and means the number of signal streams (or layers) received by the terminal via the same frequency time resource.

For example, the PMI is the value reflecting the spatial properties of the channel and denotes the precoding index of the base station, favored by the terminal with respect to the metric, such as the signal to interference plus noise ratio (SINR).

In other words, the PMI is information about the precoding matrix used for transmission from the transmission end. The precoding matrix fed back from the reception end is determined considering the number of the layers indicated by the RI.

For example, the CQI is a value indicating the strength of channel and means the reception SINR that may be obtained when the base station uses PMI. The terminal reports, to the base station, the CQI index which indicates a specific combination in a set constituted of combinations of predetermined modulation schemes and coding rates.

For example, the feedback information may be fed back on a per-subcarrier group basis.

In this case, a terminal having a wide subcarrier spacing may perform feedback on a per-subcarrier group basis in the same quantity of feedback information as when a terminal having a small subcarrier spacing feeds back information on a per-resource block basis. In other words, although information is fed back on a per-subcarrier group basis, beamforming with higher granularity may be implemented without an increase in the amount of feedback information.

According to various embodiments, the base station may identify the channel state information about the downlink estimated on a per-subcarrier group basis based on the channel state-related information transmitted from the terminal via uplink.

According to various embodiments, the channel state information about the downlink estimated on a per-subcarrier group basis as identified by the base station may be differently obtained according to the duplex scheme, such as time division duplex (TDD) and frequency division duplex (FDD).

TDD system means a scheme in which the downlink and uplink use the same frequency band and are distinguished from each other by time. Accordingly, if the coherence time of radio channel is larger, that is, when the Doppler effect is small, the downlink and uplink may be assumed to have the same radio channel characteristics. This may be referred to as reciprocity.

According to various embodiments, using the reciprocity in the TDD system, the base station may obtain the channel state information about the downlink using channel state-related information (e.g., reference signal (RS)) transmitted from the terminal.

For example, the base station may perform channel estimation on a per-subcarrier group basis, based on the sounding reference signal (SRS) transmitted from the terminal via uplink and may obtain the channel state information about the downlink estimated on a per-subcarrier group basis.

FDD system refers to a system that uses different frequencies for downlink and uplink. Thus, the base station is unable to use the channel state information estimated using the reference signals (RS) of terminals transmitted via uplink, upon downlink transmission.

According to various embodiments, since the FDD system is unable to use the characteristics of channel reciprocity like the TDD system, the base station needs to transmit a reference signal (e.g., CSI-RS) and receive a feedback of channel state information obtained based on the reference signal from the terminal, so as to obtain the channel state information about the downlink.

For example, in the FDD system, the base station may transmit a reference signal (e.g., CSI-RS) to the terminal, and the terminal may obtain channel state information (e.g., CSI) about the downlink based on the reference signal received from the base station and feed back the downlink channel state information to the base station on a per-subcarrier group basis.

In this case, the base station may identify the channel state information about the downlink estimated on a per-subcarrier group basis based on the channel state information fed back from the terminal.

According to various embodiments, the base station may calculate the beamforming vector for each subcarrier group, based on the channel state information estimated on a per-subcarrier group basis, as identified, and transmit a beamforming-applied signal to the terminal via downlink, on a per-subcarrier group basis.

According to various embodiments, the beamforming vector means a vector constituted of the weights applied to antennas. For example, the base station may perform beamforming using the received PMI or may perform beamforming using a different PMI without being restricted to the PMI transmitted from the terminal.

According to various embodiments, the subcarrier group, as the minimum scheduling unit, may be configured in the base station, on a per-channel estimation basis and on a per-beamforming basis, and may be configured in the terminal on a per-feedback unit, on a per-channel estimation basis, or on a per-data decoding basis.

According to various embodiments, the base station may apply beamforming per subcarrier group based on the channel state information estimated on a per-subcarrier group basis and transmit the subcarrier group information, which is the minimum scheduling unit of beamforming, to the terminal.

For example, as shown in FIG. 5, the base station may transmit the subcarrier group information, which is the minimum scheduling unit of beamforming, to the terminal.

According to various embodiments, the subcarrier group information may be transmitted from the base station to the terminal via downlink control information.

For example, the subcarrier group information may be transmitted from the base station to the terminal via the downlink control information (DCI) including information for controlling (scheduling) the resources of all physical layers in both directions of uplink or downlink.

According to various embodiments, the subcarrier group information may include information regarding the subcarrier group which is the minimum scheduling unit to which beamforming has been applied in the base station.

For example, the subcarrier group information may include indication information indicating the type of the subcarrier group.

For example, the type of the subcarrier group may be varied depending on the number of subcarriers included in the subcarrier group.

For example, as shown in FIG. 3, there may be four types of subcarrier groups, and the indication information indicating the type of subcarrier group may be configured with two bits.

For example, the first subcarrier group (SCG type 0) may be indicated with a bit stream of 00, the second subcarrier group (SCG type 1) may be indicated with a bit stream of 01, the third subcarrier group (SCG type 2) may be indicated with a bit stream of 10, and the fourth subcarrier group (SCG type 3) may be indicated with a bit stream of 11.

According to various embodiments, the terminal may identify information about the subcarrier group unit to which beamforming has been applied in the base station, based on the subcarrier group information received from the base station.

According to various embodiments, the terminal may estimate the channel on a per-subcarrier group basis, as identified based on the subcarrier group information received from the base station and perform data decoding.

Figure 6:
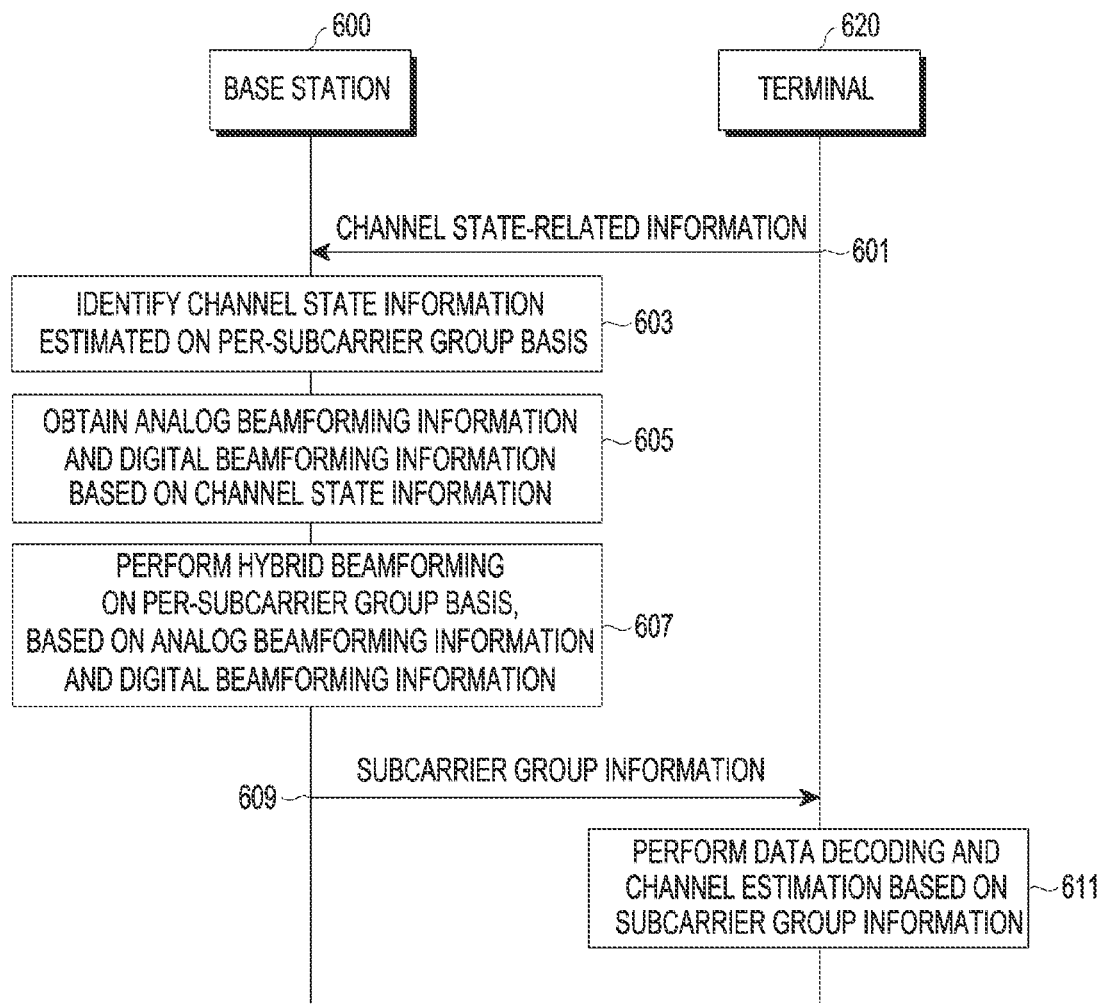
FIG. 6 is a flowchart illustrating an example of transmitting/receiving information between a base station and a terminal in a wireless access system supporting a massive MIMO system according to various embodiments.

FIG. 6 is a flowchart illustrating an example of transmitting/receiving information between a base station and a terminal in a wireless access system supporting a massive MIMO system according to various embodiments.

In operation 601, the base station may receive information related to the channel state from the terminal.

According to various embodiments, the channel state-related information may include a reference signal transmitted from the terminal on an uplink or feedback information transmitted from the terminal on the uplink, in response to a reference signal transmitted to the terminal on a downlink.

For example, the reference signal transmitted from the terminal may include a sounding reference signal (SRS).

For example, the feedback information may include channel state information (CSI) estimated on a per-subcarrier group basis, based on the channel state information reference signal (CSI-RS) received by the terminal from the base station and be fed back from the terminal to the base station on a per-subcarrier group basis.

In operation 603, the base station may identify channel state information estimated on a per-sub carrier group basis, based on the channel state-related information.

According to various embodiments, the base station may identify the channel state information about the downlink estimated on a per-subcarrier group basis based on the channel state-related information transmitted from the terminal via uplink.

For example, the channel state information may include at least one or more of the precoding matrix index (PMI), rank indicator (RI), and channel quality indicator (CQI).

For example, the base station may perform channel estimation on a per-subcarrier group basis in operation 603, based on the sounding reference signal (SRS) transmitted from the terminal via uplink in operation 601 and may obtain and identify the channel state information about the downlink estimated on a per-subcarrier group basis.

For example, the base station may identify the channel state information about the downlink estimated on a per-subcarrier group basis based on the channel state information fed back from the terminal in operation 601.

In operation 605, the base station may obtain analog beamforming information and digital beamforming information based on the channel state information.

According to various embodiments, the base station may perform hybrid beamforming which is a fusion of analog beamforming and digital beamforming structures.

According to various embodiments, the analog beamforming information may include information about a precoding matrix (weight matrix) for analog beamforming.

According to various embodiments, the analog beamforming information may be set to differ per stream or per user or the same analog beamforming information may be set for all the users or all the subcarriers.

For example, when the same analog beamforming information is configured for all the users or all the subcarriers, the precoding matrix (weight matrix) for analog beamforming in all the users or all the subcarriers is the analog precoder $V_{RF}$ having a size of $N_t \times N_t^{RF}$.

For example, when different analog beamforming information is configured per user or per stream, the precoding matrix (weight matrix) for analog beamforming in the kth terminal or subcarrier index k may be changed to the $k^{th}$ user's analog precoder $V_{RF,k}$, and $V_{RF,k}$ may be obtained according to the baseband algorithm to obtain a scheduler or digital beamforming information. This is described below in further detail with reference to FIG. 7.

According to various embodiments, the digital beamforming information may include information about a precoding matrix (weight matrix) for digital beamforming.

According to various embodiments, different digital beamforming information may be configured per user or per stream.

For example, the precoding matrix (weight matrix) for digital beamforming in the kth terminal or subcarrier index k is the $k^{th}$ user's digital precoder $V_{BB,k}$ having a size of $N_t^{RF} \times N_{s,k}$ and the digital precoder may differ per user or per stream.

According to various embodiments, the hybrid beamforming structure may include the analog precoder $V_{RF}$ and digital precoder (baseband precoder) $V_{BB,k}$ and, as shown in FIG. 2, the digital precoder $V_{BB,k}$ may be configured as a cascade of the null precoder $V_k^{null}$ and transmit layer parallelizing precoder $V_k^P$.

According to various embodiments, the $k^{th}$ user's digital beamforming information may be obtained based on information about the $k^{th}$ user's null precoder $V_k^{null}$ and information about the $k^{th}$ user's transmit layer parallelizing precoder $V_k^P$ and may be represented as $V_{BB,k} = V_k^{null} V_k^P$.

For example, according to various embodiments, the base station may obtain the information about the null precoder $V_k^{null}$ based on the analog beamforming information and the channel information identified in operation 603 and, based on the obtained information about the null precoder $V_k^{null}$, then obtain the information about the transmit layer parallelizing precoder $V_k^P$, thereby obtaining the information about the digital precoder $V_{BB,k}$.

According to various embodiments, the information about the null precoder may be obtained based on the analog beamforming information and the channel information.

For example, the information about the $k^{th}$ user's null precoder may include information about the nulling matrix used to minimize the influence from multi-user interference except for the $k^{th}$ user to rectify/separate the $k^{th}$ user's transmission signals at the reception end.

For example, the nulling matrix in the $k^{th}$ terminal or subcarrier index k is the $k^{th}$ user's null precoder $V_k^{null}$.

For example, the $k^{th}$ user's null precoder $V_k^{null}$ may be obtained based on the channel information matrix $\widetilde{H}$ considering the influence of the analog precoder $V^{RF}$.

For example, the $k^{th}$ user's null precoder $V_k^{null}$ may be obtained using the nullspace(.) after excluding the $k^{th}$ user's $\widetilde{H}_k = H_k V_{RF}$ considering the analog precoder $V_{RF}$ of the channel information matrix $\widetilde{H}$ considering the influence from $V_{RF}$.

According to various embodiments, the $k^{th}$ user's null precoder $V_k^{null}$ may be obtained using the scheme of using a codebook or a scheme via singular value interpretation.

According to various embodiments, the information about the transmit layer parallelizing precoder may be obtained based on, the information about the null precoder, the analog beamforming information and the channel information.

For example, the information about the $k^{th}$ user's transmit layer parallelizing precoder $V_k^P$ may include information about the precoding matrix necessary to easily implement the transmit power allocation of the transmit stream to meet the criterion to transmit the transmit power, with it adjusted to specific power.

For example, the $k^{th}$ user's transmit layer parallelizing precoder $V_k^P$ may be obtained based on the effective channel information matrix $H_{eff,k}$ considering influence from the $k^{th}$ user's null precoder $V_k^{null}$.

For example, the effective channel information matrix $H_{eff,k}$ may be obtained based on the channel matrix $H_k$ for the $k^{th}$ user, the analog precoder $V_{RF}$ for all the users, and the $k^{th}$ user's null precoder $V_k^{null}$, and may be represented as $$H_{eff,k} \doteq H_k V_k^{null} = H_k V_{RF} V_k^{null}.$$

For example, the information about the transmit layer parallelizing precoder $V_k^P$ may be obtained based on the effective channel information matrix $H_{eff,k}$, using at least one or more of zero forcing (ZF), minimum mean squared error (MMSE), and right singular precoding (RSP).

According to various embodiments, the $k^{th}$ user's digital precoder $V_k^P$ may be configured to allocate power per stream while meeting the power constraints by parallelizing the effective channel information matrix $H_{eff,k}$. This is described below in further detail with reference to FIG. 7.

In operation 607, the base station may perform hybrid beamforming, which is a combination of analog beamforming and digital beamforming, on a per-sub carrier group basis, based on the analog beamforming information and the digital beamforming information.

According to various embodiments, the hybrid beamforming information may include information about the precoding matrix for hybrid beamforming in the kth terminal or subcarrier index k.

For example, the precoding matrix for hybrid beamforming in the kth terminal or subcarrier index k may be obtained based on the analog precoder $V_{RF}$ and the digital precoder $V_{BB,k}$ obtained in operation 605.

For example, according to various embodiments, the hybrid beamforming structure includes the digital precoder (baseband precoder) $V_{BB,k}$ configured as a cascade precoder structure of the null precoder $V_K^{null}$ and the transmit layer parallelizing precoder $V_k^P$, and the precoding matrix for hybrid beamforming may be represented as $V_{RF} V_K^{null} V_K^P$.

According to various embodiments, the hybrid beamforming structure includes a null precoder and a transmit layer parallelizing precoder obtained based on the null precoder, thereby minimizing multi-user interference and maximizing the transmission rate for each user. Thus, the total data transmission rate may be maximized.

According to various embodiments, the base station may apply hybrid beamforming on a per-subcarrier group basis, including the same or smaller number of subcarriers as/than the number of the plurality of subcarriers included in one resource block.

Thus, according to various embodiments, when the minimum scheduling unit is configured as the subcarrier group in the base station, the maximum transmission bandwidth of the subcarrier is reduced as compared with the maximum transmission bandwidth of the resource block so that influence by frequency selectivity fading is reduced, and thus, the beamforming performance of the base station may be improved.

In operation 609, the base station may transmit subcarrier group information corresponding to the subcarrier group to the terminal.

For example, the subcarrier group information may include indication information indicating the type of the subcarrier group which is the minimum scheduling unit to which beamforming has been applied in the base station and may be transmitted from the base station to the terminal via downlink control information.

Further, the type of the subcarrier group may be varied depending on the number of subcarriers included in the subcarrier group, and the indication information indicating the type of the subcarrier group may be configured based on a bit stream.

Although not shown in the drawings, the base station may transmit hybrid beamforming-applied downlink data on a per-subcarrier group basis in operation 609.

In operation 611, the terminal may perform channel estimation and decoding based on the subcarrier group information received from the base station.

According to various embodiments, the terminal may estimate the channel on a per-subcarrier group basis, as identified based on the subcarrier group information received from the base station and perform data decoding. This is described below in further detail with reference to FIGS. 8 and 9.

Figure 7:
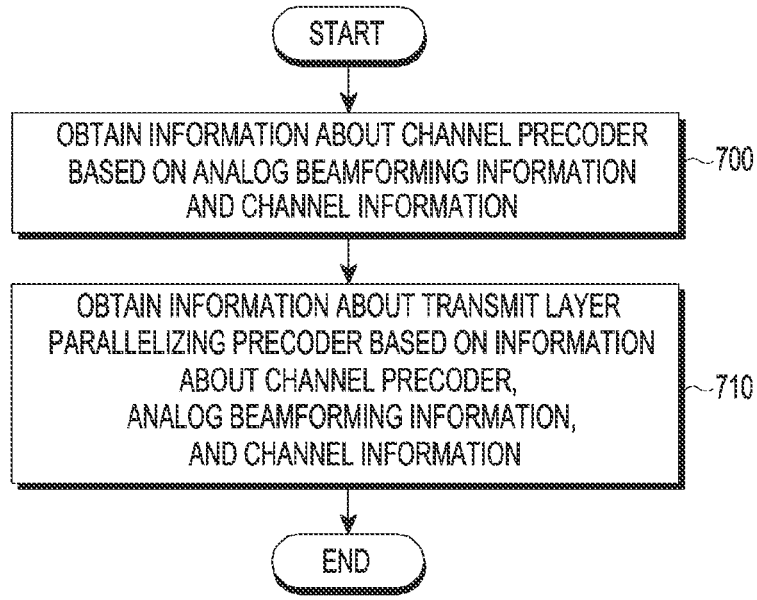
FIG. 7 is a flowchart illustrating an example of obtaining digital beamforming information by a base station according to various embodiments.

FIG. 7 is a flowchart illustrating an example of obtaining digital beamforming information by a base station according to various embodiments.

According to various embodiments, since digital beamforming enables application of an independent beamforming scheme per user or per stream, with the same time-frequency resources, the digital beamforming information may differ per user or per stream, and the digital precoder may differ per user or per stream.

According to various embodiments, the $k^{th}$ user's digital beamforming information means the $k^{th}$ user's systolic pressure and diastolic pressure $V_{BB,k}$ which is the precoding matrix (weight matrix) for digital beamforming in subcarrier index k or the $k^{th}$ terminal having a size of $N_t^{RF} \times N_{s,k}$.

As shown in FIG. 2, according to various embodiments, when the structure of the $k^{th}$ user's digital precoder (baseband precoder) $V_{BB,k}$ included in the hybrid beamforming structure is configured as a cascade precoder structure in which the null precoder $V_k^{null}$ and the stream parallelizing precoder $V_k^P$ are connected in series, $V_{BB,k} = V_k^{null} V_k^P$.

Accordingly, the $k^{th}$ user's digital beamforming information may be obtained based on information about the $k^{th}$ user's null precoder $V_k^{null}$ and information about the $k^{th}$ user's transmit layer parallelizing precoder $V_k^P$.

According to various embodiments, the base station may obtain information about the null precoder $V_k^{null}$ and, based on the obtained information about the null precoder $V_k^{null}$, then obtain information about the stream parallelizing precoder $V_k^P$, thereby obtaining information about the $k^{th}$ user's digital precoder $V_{BB,k}$.

For example, according to various embodiments, the base station may obtain information about the null precoder based on the analog beamforming information and channel information as shown, in operation 700 and obtain information about the transmit layer parallelizing precoder based on the information about the null precoder obtained in operation 700 and the channel information and analog beamforming information, as shown, in operation 710, thereby obtaining digital beamforming information.

In operation 700, the base station may obtain the information about the null precoder based on the analog beamforming information and channel information.

The base station may obtain the information about the null precoder based on the channel information matrix obtained based on the channel information and analog beamforming information.

According to various embodiments, the null precoder information may be information regarding the $k^{th}$ user's null precoder $V_k^{null}$, and the $k^{th}$ user's null precoder $V_k^{null}$ may be obtained based on the channel information matrix $\tilde{H}$ considering the influence from the analog precoder $V_{RF}$.

For example, the $k^{th}$ user's channel information matrix $\tilde{H}_k$ considering influence from $V_{RF}$ may be obtained based on information regarding the channel information matrix $H_k$ for the $k^{th}$ user and the information regarding the analog precoder $V_{RF}$ for all the users/subcarriers and be represented as $\tilde{H}_k = H_k V_{RF}$.

For example, $H_k$ means the channel information matrix in subcarrier index k or the kth terminal having a size of $N_r \times N_t$, and $V_{RF}$ means the precoding matrix (weight matrix) for analog beamforming in all the users/subcarriers having a size of $N_t \times N_t^{RF}$.

According to various embodiments, the $k^{th}$ user's null precoder $V_k^{null}$ may use the null space or orthogonality to minimize interference from the multiple users.

For example, the $k^{th}$ user's null precoder $V_k^{null}$ may be obtained based on the channel information matrix $\tilde{H}$ considering the analog precoder $V_{RF}$.

For example, the $k^{th}$ user's null precoder $V_k^{null}$ may be obtained according to the criterion as shown in Equation 9 using nullspace(.) after excluding the $k^{th}$ user's $\tilde{H}_k = H_k V_{RF}$ considering the analog precoder $V_{RF}$ of the channel information matrix $\tilde{H}$ considering influence from $V_{RF}$.

$$V_k^{null} = \text{nullspace}(H_1 V_{RF} \ldots H_{k-1} V_{RF} H_{k+1} V_{RF} \ldots H_K V_{RF})$$ [Equation 9]

To that end, $\Sigma_{K-1} N_{r,k} \times N_{RF}$ matrix $\tilde{H}_{T,k}$ in the form as shown in Equation 10 may be considered, and the matrix $\tilde{H}_{T,k}$ is a set of the other channels except for the $k^{th}$ user's channel information matrix $\tilde{H}_k$ considering $V_{RF}$ from the channel information matrix $\tilde{H}$ considering influence from $V_{RF}$.

$$\tilde{H}_{T,k} = [(H_1 V_{RF})^T \ldots (H_{k-1} V_{RF})^T (H_{k+1} V_{RF})^T \ldots (H_K V_{RF})^T]^T$$ [Equation 10]

According to various embodiments, information about the $k^{th}$ user's null precoder $V_k^{null}$ may be obtained using a scheme via singular value interpretation.

For example, since the total number of the streams of all the users, transmittable simultaneously, may not exceed the number of RF chains, the condition $N_t \gg N_{RF} \geq \Sigma_K N_{s,k}$ needs to be met.

Thus, since $\tilde{H}_{T,k}$ may be decomposed as shown in Equation 11 by singular value interpretation, the null precoder $V_k^{null}$, according to various embodiments, may be obtained as a matrix having a size of $N_{RF} \times N_{s,k}$ corresponding to singular value 0 among the right singular matrixes.

$$\tilde{H}_{T,k} = \tilde{U}_{T,k} [\tilde{\Lambda} \; 0][\tilde{V}_k \; V_k^{null}]^H$$ [Equation 11]

According to various embodiments, information about the $k^{th}$ user's null precoder $V_k^{null}$ may be obtained using a scheme using a codebook.

For example, when the codebook set is defined as a $N_{RF} \times L$ matrix $C \triangleq \{c_1 \ldots c_L\}$, the columns $c_j$ of matrix C may be assumed to be orthogonal to one another. That is, $c_l \perp c_m, l \neq m$.

According to various embodiments, codebook C may be generated in various methods to implement a constant phase over a unit circle.

For example, codebook C may be generated in such a manner that a codebook is generated with a Zadoff-Chu sequence and orthogonality is given using the cyclic shift.

For example, codebook C may be configured as a Fourier matrix having orthogonality using the discrete Fourier transform (DFT) matrix.

For example, codebook C may be configured as a steering vector set having the Vandermonde matrix, such as a steering matrix of array.

For example, codebook C may be implemented in the form of a phase shift matrix constituting the analog precoder $V_{RF}$.

According to various embodiments, $V_k^{null}$ may be implemented as a criterion as shown in Equation 12 based on the codebook C generated according to various embodiments.

$$V_k^{null} = \begin{bmatrix} c_{l_1} & \ldots & c_{l_{N_{s,k}}} \end{bmatrix} \text{ where}$$ [Equation 12]

$$\{l_1 \ldots l_{N_{s,k}}\} = \underset{l}{\text{argmin}}\{\|(\tilde{H}_{T,k})^H c_l\|_F\}$$

For example, the null precoder $V_k^{null}$ may be obtained as $$c_{l_1} \ldots c_{l_{N_{s,k}}}$$

having the smallest value of $\|(\tilde{H}_{T,k})^H C_l\|_F$.

According to various embodiments, different analog beamforming information may be configured per user or per stream.

For example, when the analog precoder $V_{RF}$ may be selected per user upon implementing the null precoder, $V_{RF}$ in Equation 6 described above may be changed to a per-user analog precoder, such as $V_{RF,k}$, and $V_{RF,k}$ may be obtained according to the baseband algorithm of obtaining a scheduler or digital beamforming information.

For example, when $V_{RF,k}$ is implemented to be used instead of the null precoder $V_k^{null}$, Equation 6 may be modified as shown in Equation 13.

$$y_k = H_k V_{RF,k} V_k^p S_k + H_k \sum_{l \neq k}^{K} V_{RF,l} V_l^p S_l + n_k$$ [Equation 13]

For example, the $k^{th}$ user's analog precoder $V_{RF,k}$ may be implemented via the null space as shown in Equation 11 or may be obtained by a method, such as Equation 13, in the codebook set predefined.

According to various embodiments, the hybrid beamforming structure includes the digital precoder (baseband precoder) $V_{BB,k}$ configured as a cascade structure of the null precoder $V_k^{null}$ and the transmit layer parallelizing precoder $V_k^p$, thereby minimizing multi-user interference and maximizing the transmission rate for each user. Thus, the total data transmission rate may be maximized.

In operation 710, the base station may obtain information about the transmit layer parallelizing precoder based on the channel information, the analog beamforming information, and the obtained null precoder information.

According to various embodiments, the base station may obtain the information about the transmit layer parallelizing precoder based on the effective channel information obtained based on the information about the null precoder obtained in operation 700 and channel information and the analog beamforming information.

For example, the information about the transmit layer parallelizing precoder is information regarding the $k^{th}$ user's transmit layer parallelizing precoder $V_k^P$.

For example, the $k^{th}$ user's transmit layer parallelizing precoder $V_k^P$ may be obtained based on the effective channel information matrix $H_{eff,k}$ considering influence from the $k^{th}$ user's null precoder $V_k^{null}$.

For example, the effective channel information matrix $H_{eff,k}$ may be obtained based on the information regarding the channel matrix $H_k$ for the $k^{th}$ user, information regarding the analog precoder $V_{RF}$ for all the users, and the information regarding the $k^{th}$ user's null precoder $V_k^{null}$ obtained in operation 700 and may be represented as $$H_{eff,k} \doteq \tilde{H}_k V_k^{null} = H_k V_{RF} V_k^{null}.$$

According to various embodiments, the transmit layer parallelizing precoder $V_k^P$ is a precoder necessary to easily implement the transmit power allocation of the transmit stream to meet the criterion to transmit transmit power, which is one major criterion of the precoder, with it adjusted to specific power. That is, it is a pre-processing precoder to distribute the transmit stream power into $N_t/N_{s,k}$ and to secure the maximum transmission rate.

For example, according to various embodiments, the information about the transmit layer parallelizing precoder $V_k^P$ may be obtained based on the effective channel information matrix $H_{eff,k}$, using at least one or more of zero forcing (ZF), minimum mean squared error (MMSE), and right singular precoding (RSP).

The above-described type of precoder is as shown in Table 1 below. In this case, $K_{n,k}$ is the noise covariance matrix defined in Equation 6.

[Table 1: scheme for configuring transmit layer parallelizing precoder $V_k^P$]

TABLE 1

| precoder scheme | precoder $V_k^P$ type |
| --- | --- |
| Zero-forcing | $V_k^P = H_{eff,k}^H (H_{eff,k}^H H_{eff,k})^{-1}$ |
| MMSE | $V_k^P = H_{eff,k}^H (H_{eff,k}^H H_{eff,k} + K_{n,k})^{-1}$ |
| Right singular precoding | $V_k^P = V$ where $H_{eff,k} = U \Lambda V^H$ |

Although not shown in the drawings, the base station may allocate transmit power to the data stream of each user based on the transmit layer parallelizing precoder $V_k^P$ obtained in operation 710.

According to various embodiments, the $k^{th}$ user's digital precoder $V_k^P$ may be configured to allocate power per stream while meeting the power constraints by parallelizing the effective channel information matrix $H_{eff,k}$.

Figure 8:
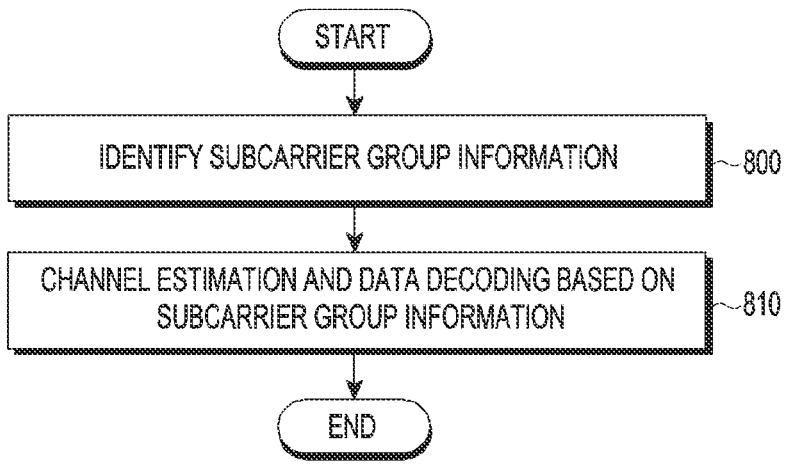
FIG. 8 is a flowchart illustrating an example of performing decoding based on a minimum scheduling unit applied to a base station, by a terminal, according to various embodiments.

FIG. 8 is a flowchart illustrating an example of performing decoding based on a minimum scheduling unit applied to a base station, by a terminal, according to various embodiments.

According to various embodiments, the minimum scheduling unit is the unit in which beamforming is applied in the base station and the unit in which channel estimation and data decoding are applied in the terminal.

For example, the subcarrier group, as the minimum scheduling unit, may be configured in the base station, on a per-channel estimation basis and on a per-beamforming basis, and may be configured in the terminal on a per-channel state information feedback unit, on a per-channel estimation basis, or on a per-data decoding basis.

In operation 800, the terminal may identify the subcarrier group information.

According to various embodiments, the terminal may receive and identify the subcarrier group information from the base station.

For example, the subcarrier group information may be transmitted from the base station to the terminal via downlink control information.

For example, the subcarrier group information may include information regarding the subcarrier group which is the minimum scheduling unit to which beamforming has been applied in the base station.

For example, the subcarrier group information may include indication information indicating the type of the subcarrier group, and the indication information may be configured as a bit stream.

For example, the type of the subcarrier group may be varied depending on the number of subcarriers included in the subcarrier group.

For example, as shown in FIG. 3, there may be four types of subcarrier groups, and the indication information indicating the type of subcarrier group may be configured with two bits.

For example, the first subcarrier group (SCG type 0) including 12 subcarriers may be indicated with a bit stream of 00, the second subcarrier group (SCG type 1) including six subcarriers may be indicated with a bit stream of 01, the third subcarrier group (SCG type 2) including four subcarriers may be indicated with a bit stream of 10, and the fourth subcarrier group (SCG type 3) including three subcarriers may be indicated with a bit stream of 11.

According to various embodiments, the terminal may identify the subcarrier group based on the indication information included in the subcarrier group information received from the base station and identify the identified subcarrier group as the minimum scheduling unit to which beamforming has been applied in the base station. This is described below in further detail with reference to FIG. 9.

In operation 810, the terminal may perform channel estimation and data decoding using the identified subcarrier group information.

According to various embodiments, the terminal may estimate the channel in the minimum scheduling unit identified based on the subcarrier group information received from the base station and perform data decoding.

For example, the minimum scheduling unit may be the subcarrier group to which beamforming has been applied in the base station and in which the terminal may estimate the channel on a per-subcarrier group basis and perform decoding on the data received from the base station, on a per-subcarrier group basis.

Figure 9:
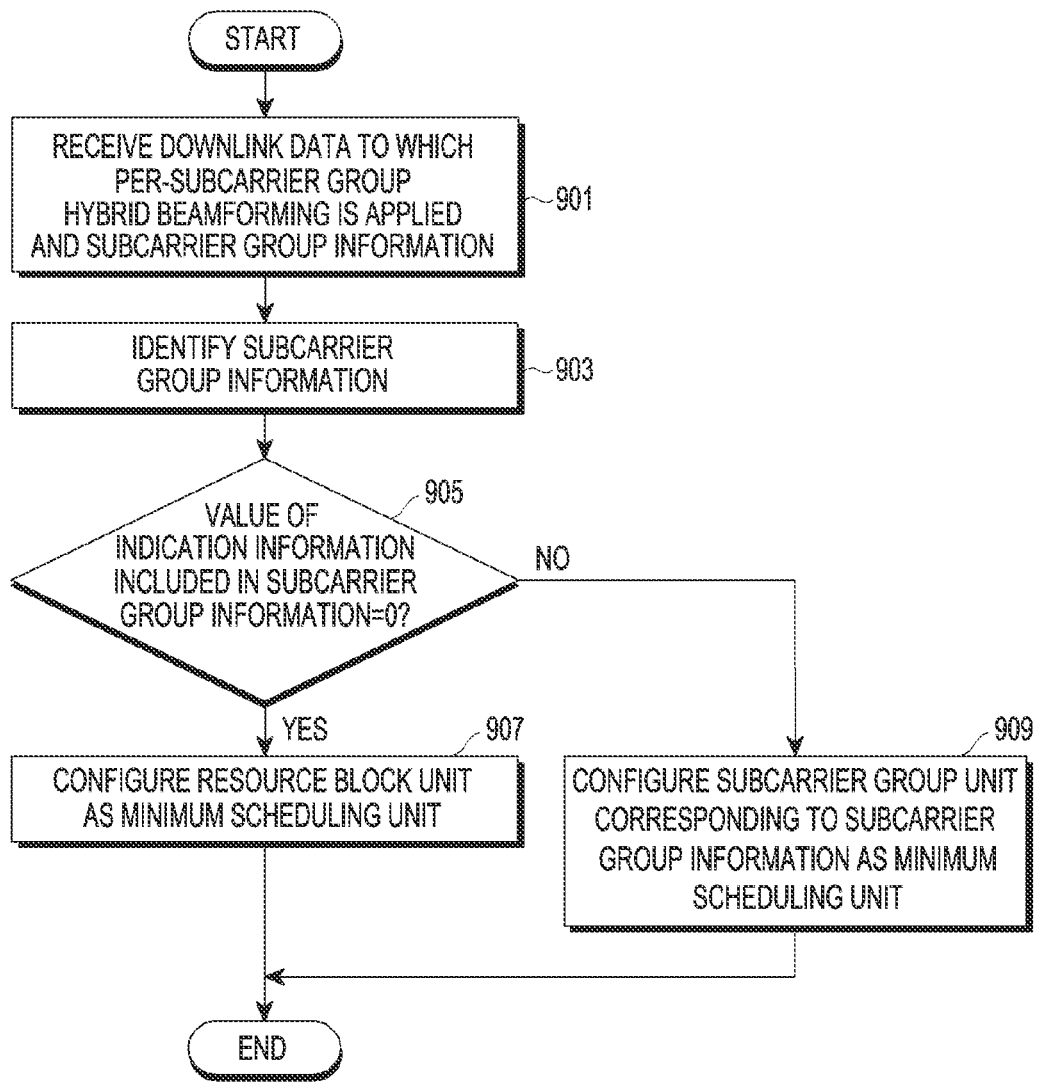
FIG. 9 is a view illustrating the operation of identifying, by a terminal, a minimum scheduling unit applied in a base station and configuring the identified minimum scheduling unit in the terminal, according to various embodiments.

FIG. 9 is a view illustrating the operation of identifying, by a terminal, a minimum scheduling unit applied in a base station and configuring the identified minimum scheduling unit in the terminal, according to various embodiments.

In operation 901, the terminal may receive the subcarrier group information and the downlink data to which hybrid beamforming has been applied on a per-subcarrier group basis.

For example, the subcarrier group information may be transmitted from the base station to the terminal via downlink control information (DCI format).

For example, the downlink data to which hybrid beamforming has been applied on a per-subcarrier group basis may be transmitted from the base station to the terminal via a downlink message.

In operation 903, the terminal may identify the subcarrier group information corresponding to the subcarrier group.

For example, the subcarrier group information may include information regarding the subcarrier group which is the minimum scheduling unit to which beamforming has been applied in the base station.

For example, the subcarrier group information may include indication information indicating the type of the subcarrier group, and the indication information may be configured as a bit stream.

For example, the type of the subcarrier group may be varied depending on the number of subcarriers included in the subcarrier group.

For example, as shown in FIG. 3, there may be four types of subcarrier groups, and the indication information indicating the type of subcarrier group may be configured with two bits.

For example, as shown in FIG. 3, the first subcarrier group (SCG type 0) including 12 subcarriers may be indicated with a bit stream of 00, the second subcarrier group (SCG type 1) including six subcarriers may be indicated with a bit stream of 01, the third subcarrier group (SCG type 2) including four subcarriers may be indicated with a bit stream of 10, and the fourth subcarrier group (SCG type 3) including three subcarriers may be indicated with a bit stream of 11.

In operation 905, the terminal may identify whether the indication information included in the subcarrier group information is 0.

According to various embodiments, the terminal may identify the minimum scheduling unit applied to beamforming in the base station, based on the indication information included in the subcarrier group information.

For example, since the value of the indication information may be determined based on the bit stream of the indication information, and the bit stream of the indication information corresponds to each subcarrier group, the subcarrier group of the minimum scheduling unit applied to beamforming may be identified in the base station based on the value of the indication information.

For example, as shown in FIG. 3, the value of the indication information of the first subcarrier group (SCG type 0) for which the bit stream of the indication information is 00 may be 0, the value of the indication information of the second subcarrier group (SCG type 1) for which the bit stream of the indication information is 01 may be 1, the value of the indication information of the third subcarrier group (SCG type 2) for which the bit stream of the indication information is 10 may be 2, and the value of the indication information of the fourth subcarrier group (SCG type 3) for which the bit stream of the indication information is 11 may be 3.

In operation 905, when the value of the indication information included in the subcarrier group information identified by the terminal is 0, this means that the minimum scheduling unit to which beamforming has been applied in the base station is the first subcarrier group including 12 subcarriers. In operation 907, the terminal may set one resource block unit including 12 subcarriers as the minimum scheduling unit in the terminal.

In operation 905, unless the value of the indication information included in the subcarrier group information identified by the terminal is 0, this means that the minimum scheduling unit to which beamforming has been applied in the base station is a subcarrier group including a smaller number of subcarriers than 12. In operation 909, the terminal may set the subcarrier group unit as the minimum scheduling unit in the terminal.

Although not shown in the drawings, the terminal may perform channel estimation and decoding in the minimum scheduling unit set in operation 907 or 909.

Figure 10:
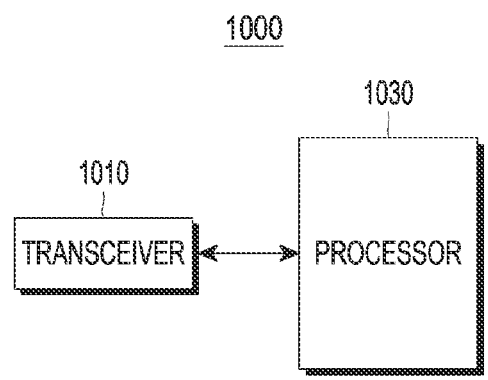
FIG. 10 is a block diagram illustrating components of a base station 1000 according to various embodiments.

FIG. 10 is a block diagram illustrating components of a base station 1000 according to various embodiments.

A wireless communication system includes a base station 1000 and a plurality of terminals 1100 positioned in the coverage of the base station.

Referring to FIG. 10, the base station 1000 may include a transceiver 1010 and a processor 1030.

Although not shown in the drawings, the base station 1000 may further include a memory (not shown).

For example, the base station 1000 may further include a memory storing a basic program for operating the base station 1000, application programs, control information or other data.

The memory is connected with the processor 1030 to store various pieces of information for driving the processor 1030. The memory may be positioned inside or outside the processor 1030 and be connected with the processor 1030 via various known means.

For example, the memory may include at least one type of storage medium of flash memory types, hard disk types, multimedia card micro types, card types of memories (e.g., SD or XD memory cards), magnetic memories, magnetic disks, or optical discs, random access memories (RAMs), static random access memories (SRAMs), read-only memories (ROMs), programmable read-only memories (PROMs), or electrically erasable programmable read-only memories (EEPROMs). The processor 1030 may perform various operations using various programs, contents, or data stored in the memory.

The processor 1030 implements the functions, processes, and/or methods proposed above. Wireless interface protocol layers may be implemented by the processor 1030.

Figure 11:
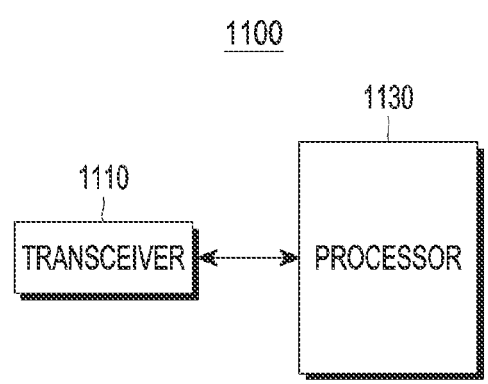
FIG. 11 is a block diagram illustrating components of a terminal 1100 according to various embodiments.

The base station 1000 shown in FIG. 10 and/or the terminal 1100 shown in FIG. 11 may have multiple antennas. In particular, according to the present invention, the base station 1000 and the terminal 1100 may be implemented to support the above-described massive MIMO system.

According to various embodiments, the transceiver 1010 is connected with the processor 1030 to transmit and/or receive wireless signals. For example, according to various embodiments of the present invention, the transceiver 1010 may transmit and receive signals, information, or data.

According to various embodiments, the transceiver 1010 may receive channel state-related information from the terminal 1100.

According to various embodiments, the channel state-related information may include a reference signal transmitted from the terminal 1100 via uplink.

For example, the reference signal transmitted from the terminal 1100 via uplink may include a sounding reference signal (SRS).

According to various embodiments, the channel state-related information may include feedback information transmitted to the terminal 1100 via uplink, in response to the reference signal transmitted via downlink.

For example, the feedback information transmitted from the terminal 1100 via uplink may include channel state information about the downlink estimated on a per-subcarrier group basis.

For example, the feedback information may be fed back from the terminal 1100 on a per-subcarrier group basis.

For example, the feedback information may include channel state information (CST) estimated on a per-subcarrier group basis, based on the channel state information reference signal (CSI-RS) received by the terminal 1100 from the base station 1000 via downlink and be fed back from the terminal 1100 to the base station 1000 on a per-subcarrier group basis.

According to various embodiments, the transceiver 1010 may transmit the subcarrier group information corresponding to the subcarrier group which is the minimum scheduling unit to which beamforming has been applied in the base station 1000.

For example, the subcarrier group may include the same or smaller number of subcarriers as/than a plurality of subcarriers included in one resource block.

For example, the subcarrier group information includes indication information indicating the type of the subcarrier group. The indication information included in the subcarrier group information may be constituted of a bit stream corresponding to the subcarrier group.

For example, the type of the subcarrier group may be varied depending on the number of subcarriers included in the subcarrier group.

For example, the subcarrier spacing of the subcarriers included in the subcarrier group may include at least one of 15 KHz, 30 KHz, 60 KHz, 160 KHz, 120 KHz, 240 KHz, and 480 KHz.

According to an embodiment, the processor 1030 may control the overall operation of the base station 1000. The processor 1030 may control the overall operation of the base station 1000 according to various embodiments as described above.

According to various embodiments, the processor 1030 may identify the channel state information estimated on a per-subcarrier group basis based on the channel state-related information transmitted from the terminal 1100.

For example, the channel state information estimated on a per-subcarrier group basis may be channel state information about downlink and may include at least one or more of the precoding matrix index (PMI), rank indicator (RI), and channel quality indicator (CQI).

For example, the base station 1000 may perform channel estimation on a per-subcarrier group basis, based on the sounding reference signal (SRS) transmitted from the terminal 1100 via uplink and may obtain and identify the channel state information about the downlink estimated on a per-subcarrier group basis.

For example, the base station 1000 may identify the channel state information about the downlink estimated on a per-subcarrier group basis based on the feedback information fed back from the terminal 1100.

According to various embodiments, the processor 1030 may obtain analog beamforming information and digital beamforming information based on the channel state information estimated on a per-subcarrier group basis.

According to various embodiments, the analog beamforming information may include information about a precoding matrix (weight matrix) for analog beamforming.

According to various embodiments, the analog beamforming information may be set to differ per stream or per user or the same analog beamforming information may be set for all the users or all the subcarriers.

According to various embodiments, the digital beamforming information may include information about a precoding matrix (weight matrix) for digital beamforming.

According to various embodiments, different digital beamforming information may be configured per user or per stream.

For example, the precoding matrix (weight matrix) for digital beamforming in subcarrier index k or the kth terminal 1100 may be the kth user's digital precoder $V_{BB,k}$ having a size of $N_t^{RF} \times N_{s,k}$, and the digital precoder may differ per user or per stream.

According to various embodiments, the hybrid beamforming structure may include the analog precoder $V_{RF}$ and digital precoder (baseband precoder) $V_{BB,k}$ and, as shown in FIG. 2, the digital precoder $V_{BB,k}$ may be configured as a cascade of the null precoder $V_k^{null}$ and transmit layer parallelizing precoder $V_k^P$.

According to various embodiments, the $k^{th}$ user's digital beamforming information may be obtained based on information about the $k^{th}$ user's null precoder $V_k^{null}$ and information about the $k^{th}$ user's transmit layer parallelizing precoder $V_k^P$ and may be represented as $V_{BB,k} = V_k^{null} V_k^P$.

According to various embodiments, the base station 1000 may obtain the information about the null precoder $V_k^{null}$ based on the analog beamforming information and the channel information and, based on the obtained information about the null precoder $V_k^{null}$, then obtain the information about the transmit layer parallelizing precoder $V_k^P$, thereby obtaining the information about the digital precoder $V_{BB,k}$.

According to various embodiments, the information about the null precoder may be obtained based on the analog beamforming information and the channel information.

For example, the $k^{th}$ user's null precoder $V_k^{null}$ may be obtained using the nullspace(•) after excluding the $k^{th}$ user's $\tilde{H}_k = H_k V_{RF}$ considering the analog precoder $V_{RF}$ of the channel information matrix $\tilde{H}$ considering the influence from $V_{RF}$ to minimize multi-user interference.

According to various embodiments, the information about the null precoder may be obtained based on the codebook.

According to various embodiments, codebook C may be generated in various methods to implement a constant phase over a unit circle.

For example, codebook C may be generated in such a manner that a codebook is generated with a Zadoff-Chu sequence and orthogonality is given using the cyclic shift.

For example, codebook C may be configured as a Fourier matrix having orthogonality using the discrete Fourier transform (DFT) matrix.

For example, codebook C may be configured as a steering vector set having the Vandermonde matrix, such as a steering matrix of array.

For example, codebook C may be implemented in the form of a phase shift matrix constituting the analog precoder $V_{RF}$.

According to various embodiments, the information about the transmit layer parallelizing precoder may be obtained based on the obtained null precoder information, the analog beamforming information and the channel information.

For example, the kth user's transmit layer parallelizing precoder $V_k^P$ may be obtained based on the effective channel information matrix $H_{eff,k}$ considering influence from the kth user's null precoder $V_k^{null}$.

For example, the effective channel information matrix $H_{eff,k}$ may be obtained based on the information regarding the channel matrix $H_k$ for the kth user, the information regarding the analog precoder $V_{RF}$ for all the users, and the information regarding the kth user's null precoder $V_k^{null}$, and may be represented as $$H_{eff,k} \doteq \tilde{H}_k V_k^{null} = H_k V_{RF} V_k^{null}.$$

For example, according to various embodiments, the information about the transmit layer parallelizing precoder $V_k^p$ may be obtained based on the effective channel information matrix $H_{eff,k}$, using at least one or more of zero forcing (ZF), minimum mean squared error (MMSE), and right singular precoding (RSP).

FIG. 11 is a block diagram illustrating components of a terminal 1100 according to various embodiments.

Referring to FIG. 11, the terminal 1100 may include a transceiver 1110 and a processor 1130.

Although not shown in the drawings, the base station 1000 may further include a memory (not shown).

For example, the terminal 1100 may further include a memory storing a basic program for operating the terminal 1100, application programs, control information or other data.

The memory is connected with the processor 1130 to store various pieces of information for driving the processor 1130. The memory may be positioned inside or outside the processor 1130 and be connected with the processor 1130 via various known means.

The processor 1130 implements the functions, processes, and/or methods proposed above. Wireless interface protocol layers may be implemented by the processor 1130.

According to various embodiments, the transceiver 1110 is connected with the processor 1130 to transmit and/or receive wireless signals. For example, according to various embodiments of the present invention, the transceiver 1010 may transmit and receive signals, information, or data.

According to various embodiments, the transceiver 1110 may transmit channel state-related information to the base station 1000.

For example, the channel state-related information may include a reference signal transmitted on an uplink or feedback information transmitted on the uplink, in response to a reference signal may receive ed on a downlink.

For example, the reference signal transmitted from the terminal 1100 via uplink may include a sounding reference signal (SRS).

For example, the feedback information may include channel state information (CSI) estimated on a per-subcarrier group basis, based on the channel state information reference signal (CSI-RS) received by the terminal 1100 from the base station 1000 and be fed back from the terminal 1100 to the base station 1000 on a per-subcarrier group basis.

According to various embodiments, the transceiver 1100 may receive the subcarrier group information corresponding to the subcarrier group unit which is the minimum scheduling unit to which beamforming has been applied in the base station 1000, from the base station 1000.

For example, the subcarrier group may include the same or smaller number of subcarriers as/than a plurality of subcarriers included in one resource block.

For example, the subcarrier group information includes indication information indicating the type of the subcarrier group. The indication information included in the subcarrier group information may be constituted of a bit stream corresponding to the subcarrier group.

For example, the type of the subcarrier group may be varied depending on the number of subcarriers included in the subcarrier group.

According to various embodiments, the transceiver 1110 may receive, from the base station 1000, the downlink data to which hybrid beamforming has been applied on a per-subcarrier group basis.

According to an embodiment, the processor 1130 may control the overall operation of the terminal 1100. The processor 1130 may control the overall operation of the terminal 1100 according to various embodiments as described above.

According to various embodiments, the processor 1130 may perform channel estimation and decoding based on the subcarrier information received from the base station 1000.

For example, the subcarrier group information may include information regarding the subcarrier group which is the minimum scheduling unit to which beamforming has been applied in the base station 1000.

For example, the subcarrier group information may include indication information indicating the type of the subcarrier group, and the indication information may be configured as a bit stream corresponding to the subcarrier group.

According to various embodiments, the processor 1130 may identify the minimum scheduling unit applied to beamforming in the base station 1000, based on the indication information included in the identified subcarrier group information.

For example, since the value of the indication information may be determined based on the bit stream of the indication information, and the bit stream of the indication information corresponds to each subcarrier group, the subcarrier group of the minimum scheduling unit applied to beamforming may be identified in the base station 1000 based on the value of the indication information.

According to various embodiments, the processor 1130 may perform channel estimation and decoding based on the identified minimum scheduling unit.

For example, the processor 1130 may set the identified minimum scheduling unit, to which beamforming has been applied in the base station 1000, as the minimum scheduling unit in the terminal 1100.

For example, the subcarrier group, as the minimum scheduling unit, may be configured in the base station 1000, on a per-channel estimation basis and on a per-beamforming basis, and may be configured in the terminal 1100 on a per-channel state information feedback unit, on a per-channel estimation basis, or on a per-data decoding basis.

For example, the processor 1130 may estimate channel and perform data decoding in the units of the subcarrier group to which beamforming has been applied in the base station 1000.

The above-described embodiments regard predetermined combinations of the components and features of the disclosure. Each component or feature should be considered as optional unless explicitly mentioned otherwise. Each component or feature may be practiced in such a manner as not to be combined with other components or features.

Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof.

When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs).

Processors, controllers, micro-controllers, or micro-processors. When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the present invention should be determined by reasonable interpretations of the appended claims and all equivalents of the present invention belong to the scope of the present invention.

The invention claimed is:

1. A method for performing downlink beamforming by a base station in a wireless access system, the method comprising:
receiving channel state-related information from a terminal;
identifying channel state information estimated on a per-subcarrier group basis, based on the channel state-related information;
obtaining analog beamforming information and digital beamforming information based on the channel state information;
performing hybrid beamforming, which is a combination of analog beamforming and digital beamforming, on a per-subcarrier group basis, based on the analog beamforming information and the digital beamforming information; and
transmitting subcarrier group information corresponding to the subcarrier group, wherein
the subcarrier group includes a number of subcarriers less than or equal to a number of a plurality of subcarriers included in one resource block.

2. The method of claim 1, wherein
the channel state-related information includes a reference signal transmitted on an uplink from the terminal.

3. The method of claim 1, wherein
the channel state-related information includes feedback information transmitted on an uplink from the terminal, in response to a reference signal transmitted on a downlink, and wherein
the feedback information includes channel state information about the downlink estimated on a per-subcarrier group basis.

4. The method of claim 1, wherein
the subcarrier group information includes indication information indicating a type of a subcarrier group, the indication information being configured as a bit stream corresponding to the subcarrier group, and wherein
the type of the subcarrier group is varied according to a number of subcarriers included in the subcarrier group.

5. The method of claim 1, wherein
the digital beamforming information is obtained based on information about a null precoder and information about a transmit layer parallelizing precoder, wherein
the information about the null precoder is obtained based on the analog beamforming information and the channel information, wherein
the information about the transmit layer parallelizing precoder is obtained based on the obtained information about the null precoder, the analog beamforming information, and the channel information, wherein
the analog beamforming information is configured to be identical or different per user, and wherein
the information about the null precoder is obtained based on a codebook.

6. The method of claim 5, wherein
the information about the transmit layer parallelizing precoder is obtained using at least one of zero forcing (ZF), minimum mean squared error (MMSE), or right singular precoding (RSP), based on the information about the null precoder, the analog beamforming information, and the channel information.

7. A method performed by a terminal in a wireless access system, the method comprising:
receiving subcarrier group information corresponding to a subcarrier group unit to which beamforming is applied by a base station, from the base station;
identifying the subcarrier group information; and
performing channel estimation and decoding based on the identified subcarrier group information, wherein
the subcarrier group includes a number of subcarriers less than or equal to a number of a plurality of subcarriers included in one resource block.

8. The method of claim 7, further comprising
receiving downlink data to which per-subcarrier group hybrid beamforming is applied.

9. The method of claim 7, wherein
the subcarrier group information includes indication information indicating a type of a subcarrier group, the indication information being configured as a bit stream corresponding to the subcarrier group.

10. The method of claim 9, wherein
the type of the subcarrier group unit is varied according to a number of subcarriers included in the subcarrier group.

11. The method of claim 9, wherein
performing channel estimation and decoding based on the identified subcarrier group information includes:
based on the indication information included in the identified subcarrier group information, identifying a minimum scheduling unit; and
performing the channel estimation and the decoding based on the identified minimum scheduling unit.

12. The method of claim 7, further comprising:
transmitting channel state-related information to the base station, wherein
the channel state-related information includes a reference signal transmitted on an uplink or feedback information transmitted on the uplink, in response to a reference signal transmitted on a downlink, and wherein
the feedback information includes channel state information about the downlink estimated on a per-subcarrier group basis.

13. A base station configured to perform downlink beamforming in a wireless access system, the base station comprising:
a transceiver configured to transmit and receive a wireless signal; and a processor, wherein
the processor is configured to:
control the transceiver to receive channel state-related information from a terminal;
identify channel state information estimated on a per-sub carrier group basis, based on the channel state-related information;
obtain analog beamforming information and digital beamforming information based on the channel state information;
perform hybrid beamforming, which is a combination of analog beamforming and digital beamforming, on a per-sub carrier group basis, based on the analog beamforming information and the digital beamforming information; and
control the transceiver to transmit sub carrier group information corresponding to the sub carrier group, wherein
the subcarrier group includes a number of subcarriers less than or equal to a number of a plurality of subcarriers included in one resource block.

14. The base station of claim 13, wherein
the digital beamforming information includes information about a null precoder and information about a transmit layer parallelizing precoder, wherein
the information about the null precoder is obtained based on the analog beamforming information and the channel information, and wherein
the information about the transmit layer parallelizing precoder is obtained based on the obtained information about the null precoder, the analog beamforming information, and the channel information.

15. A terminal in a wireless access system, the terminal comprising:
a transceiver configured to transmit and receive a wireless signal; and
a processor, wherein
the processor is configured to:
control the transceiver to receive subcarrier group information corresponding to a subcarrier group unit to which beamforming is applied by a base station, from the base station;
identify the subcarrier group information; and
perform channel estimation and decoding based on the identified subcarrier group information, wherein
the subcarrier group includes a number of subcarriers less than or equal to a number of a plurality of subcarriers included in one resource block.

* * * * *